US011078640B2

(12) United States Patent
Shany et al.

(10) Patent No.: US 11,078,640 B2
(45) Date of Patent: Aug. 3, 2021

(54) OIL SPILL SPREAD PREVENTION BY IMMEDIATE CONTAINMENT

(71) Applicant: HARBO Technologies Ltd., Tel-Aviv (IL)

(72) Inventors: Arnon Shany, Moshav Neve Yarak (IL); Boaz Ur, Tel-Aviv (IL); Haim Greenberg, Ramat-Gan (IL)

(73) Assignee: HARBO Technologies Ltd., Bnei-Brak (IL)

( * ) Notice: Subject to any disclaimer, the term of this patent is extended or adjusted under 35 U.S.C. 154(b) by 0 days.

(21) Appl. No.: 16/633,217

(22) PCT Filed: Jul. 20, 2018

(86) PCT No.: PCT/IL2018/050806
§ 371 (c)(1),
(2) Date: Jan. 23, 2020

(87) PCT Pub. No.: WO2019/021272
PCT Pub. Date: Jan. 31, 2019

(65) Prior Publication Data
US 2020/0181863 A1    Jun. 11, 2020

Related U.S. Application Data

(60) Provisional application No. 62/536,021, filed on Jul. 24, 2017.

(51) Int. Cl.
*E02B 15/08* (2006.01)

(52) U.S. Cl.
CPC ...... *E02B 15/0885* (2013.01); *E02B 15/0807* (2013.01)

(58) Field of Classification Search
CPC .. E02B 15/08; E02B 15/0807; E02B 15/0814; E02B 15/0871; E02B 15/0885; E02B 15/06; E02B 15/0892; Y02A 20/204
See application file for complete search history.

(56) References Cited

U.S. PATENT DOCUMENTS

| 2,853,006 A | 9/1958 | Moir |
| 3,126,669 A | 3/1964 | Gausewitz |
| 3,237,414 A | 3/1966 | Straub et al. |
| 3,248,939 A | 5/1966 | Silverstein |
| 3,321,923 A | 5/1967 | Smith et al. |

(Continued)

FOREIGN PATENT DOCUMENTS

| CA | 2036368 | 8/1991 |
| CN | 2350436 | 11/1999 |

(Continued)

OTHER PUBLICATIONS

International Search Report and the Written Opinion dated Nov. 6, 2018 From the International Searching Authority Re. Application No. PCT/IL2018/050806. (14 pages).

(Continued)

*Primary Examiner* — Carib A Oquendo

(57) ABSTRACT

A boom for containing floating material spilled in water including an elongated sheet including units and spaces between the units, each one of the units including a plurality of plates attached to the sheet, designed to fold flat when packed, and to self-expand into a polygonal cross-sectional shape when unpacked. Related apparatus and methods are also described.

20 Claims, 23 Drawing Sheets

(56) References Cited

U.S. PATENT DOCUMENTS

| | | |
|---|---|---|
| 3,476,246 A | 11/1969 | Dahan |
| 3,499,290 A | 3/1970 | Smith |
| 3,499,291 A | 3/1970 | Mikkelsen |
| 3,503,512 A | 3/1970 | Desty et al. |
| 3,563,036 A | 2/1971 | Smith et al. |
| 3,567,019 A | 3/1971 | Headrick |
| 3,581,899 A | 6/1971 | Hunter et al. |
| 3,592,008 A | 7/1971 | Trindle |
| 3,608,316 A | 9/1971 | Manuel |
| 3,613,377 A | 10/1971 | Zaugg |
| 3,638,429 A | 2/1972 | Sladek et al. |
| 3,650,406 A | 3/1972 | Brown et al. |
| 3,653,213 A | 4/1972 | Childers |
| 3,662,891 A | 5/1972 | Headrick |
| 3,664,504 A | 5/1972 | Ayers et al. |
| 3,708,982 A | 1/1973 | Blockwick |
| 3,744,253 A | 7/1973 | Williams et al. |
| 3,756,031 A | 9/1973 | Smith et al. |
| 3,798,911 A | 3/1974 | Oberg |
| 3,818,708 A | 6/1974 | Benson |
| 3,828,380 A | 8/1974 | Lebovits et al. |
| 3,844,122 A | 11/1974 | Bliss, Jr. |
| 3,845,633 A | 11/1974 | Hammond |
| 3,849,989 A | 11/1974 | Preus |
| 3,859,796 A | 1/1975 | Benson |
| 3,883,433 A | 5/1975 | March et al. |
| 3,901,753 A | 8/1975 | Oeberg |
| 3,919,847 A | 11/1975 | Ballu |
| 3,922,860 A | 12/1975 | Tanksley |
| 3,922,862 A | 12/1975 | Vidilles |
| 3,935,690 A | 2/1976 | Lea et al. |
| 3,958,521 A | 5/1976 | Memoli |
| RE28,966 E | 9/1976 | Blockwick |
| 3,998,060 A | 12/1976 | Preus |
| 4,030,304 A | 6/1977 | West |
| 4,065,923 A | 1/1978 | Preus |
| 4,068,478 A | 1/1978 | Meyers et al. |
| 4,123,911 A | 11/1978 | Finigan et al. |
| 4,124,981 A | 11/1978 | Preus |
| 4,174,186 A | 11/1979 | Kasai et al. |
| 4,188,155 A | 2/1980 | Langermann |
| 4,244,819 A | 1/1981 | Ballu |
| 4,260,285 A | 4/1981 | Kurihara et al. |
| 4,270,874 A | 6/1981 | March et al. |
| 4,295,755 A | 10/1981 | Meyers |
| 4,295,756 A | 10/1981 | Blair |
| 4,319,858 A | 3/1982 | Jaffrennou et al. |
| 4,329,747 A | 5/1982 | Russell |
| 4,330,223 A | 5/1982 | Webb |
| 4,333,463 A | 6/1982 | Holtman |
| 4,487,151 A | 12/1984 | Deiana |
| 4,639,227 A | 1/1987 | Rademakers |
| 4,650,368 A | 3/1987 | Bayer |
| 4,652,173 A | 3/1987 | Kallestad |
| 4,711,067 A | 12/1987 | Magni |
| 4,749,600 A | 6/1988 | Cullen et al. |
| 4,781,493 A | 11/1988 | Fischer |
| 4,802,791 A | 2/1989 | Fisher et al. |
| 4,894,964 A | 1/1990 | Thrift et al. |
| 4,930,171 A | 6/1990 | Frantz |
| 4,964,758 A | 10/1990 | Pekelny |
| 4,998,845 A | 3/1991 | Smith |
| 5,020,940 A | 6/1991 | Smith |
| 5,040,918 A | 8/1991 | Taricco |
| 5,071,286 A | 12/1991 | Separovich |
| 5,074,709 A | 12/1991 | Stensland |
| 5,102,261 A | 4/1992 | Gunderson, III |
| 5,110,236 A | 5/1992 | Santamaria |
| 5,120,159 A | 6/1992 | Smith |
| 5,152,636 A | 10/1992 | Myers |
| 5,173,008 A | 12/1992 | Thorell et al. |
| 5,195,844 A | 3/1993 | Goans |
| 5,197,821 A | 3/1993 | Cain et al. |
| 5,201,607 A | 4/1993 | Whidden, Jr. |
| 5,238,327 A | 8/1993 | Blair et al. |
| 5,252,001 A | 10/1993 | Quinn |
| 5,308,191 A | 5/1994 | Goans |
| 5,317,770 A | 6/1994 | Sakurai |
| 5,328,607 A | 7/1994 | Soule |
| 5,346,329 A | 9/1994 | Goans et al. |
| 5,362,180 A | 11/1994 | Canning et al. |
| 5,372,455 A | 12/1994 | Tarca et al. |
| 5,374,211 A | 12/1994 | Imazato |
| 5,376,345 A | 12/1994 | Pfeffere |
| 5,433,994 A | 7/1995 | McKinney et al. |
| 5,480,262 A | 1/1996 | Russo, III |
| 5,522,674 A | 6/1996 | Cooper |
| 5,547,313 A | 8/1996 | Holland |
| 5,580,185 A | 12/1996 | Ware |
| 5,695,300 A | 12/1997 | Echols et al. |
| 5,711,634 A | 1/1998 | Oberg |
| 5,860,252 A | 1/1999 | Oeberg |
| 5,885,451 A | 3/1999 | Porrovecchio, Sr. |
| 5,900,195 A | 5/1999 | Pool et al. |
| D427,323 S | 6/2000 | Lihan et al. |
| 6,073,382 A | 6/2000 | Willener |
| 6,085,628 A | 7/2000 | Street et al. |
| 6,095,840 A | 8/2000 | Yamaguchi et al. |
| 6,115,954 A | 9/2000 | Willener et al. |
| 6,767,162 B2 | 7/2004 | Meyers et al. |
| 6,797,857 B2 | 9/2004 | Tanhehco |
| 6,860,677 B2 | 3/2005 | Johnston |
| 6,942,422 B2 | 9/2005 | Byrd et al. |
| 7,090,432 B2 | 8/2006 | Jackson |
| 7,172,367 B2 | 2/2007 | Jeory |
| 7,497,643 B2 | 3/2009 | Carnahan et al. |
| 8,007,202 B2 | 8/2011 | Davis et al. |
| 8,398,334 B1 | 3/2013 | Doyle |
| 8,450,389 B1 | 5/2013 | Barefoot |
| 8,622,650 B2 | 1/2014 | Lifton |
| 8,721,220 B2 | 5/2014 | Fore, III |
| 8,821,363 B1 | 9/2014 | Barefoot |
| 9,206,575 B2 | 12/2015 | Miller et al. |
| 9,487,926 B1 | 11/2016 | Miller et al. |
| 9,808,726 B2 | 4/2017 | Johnson |
| 9,683,345 B2 | 6/2017 | Joiner et al. |
| 9,739,023 B2 | 8/2017 | Shany et al. |
| 9,809,942 B2 | 11/2017 | Miller et al. |
| 10,544,558 B2 | 1/2020 | Shany et al. |
| 2002/0018695 A1 | 2/2002 | Johnson |
| 2006/0099033 A1 | 5/2006 | Boraggina |
| 2007/0238373 A1 | 10/2007 | Henrikson |
| 2009/0000876 A1 | 1/2009 | Ablabutyan et al. |
| 2010/0150655 A1 | 6/2010 | Kilvert |
| 2010/0278591 A1 | 11/2010 | Tasker |
| 2011/0221199 A1 | 9/2011 | Boyce |
| 2011/0280660 A1 | 11/2011 | Bahukudumbi et al. |
| 2011/0318109 A1 | 12/2011 | Miller et al. |
| 2012/0020732 A1 | 1/2012 | Stiles et al. |
| 2014/0076298 A1 | 3/2014 | Meggs et al. |
| 2014/0190389 A1 | 7/2014 | Montousse |
| 2014/0213662 A1 | 7/2014 | Boris et al. |
| 2015/0065974 A1 | 3/2015 | Michiels et al. |
| 2015/0086270 A1 | 3/2015 | Shany et al. |
| 2017/0233967 A1 | 8/2017 | Shany et al. |
| 2017/0306580 A1 | 10/2017 | Shany et al. |
| 2020/0181862 A1 | 6/2020 | Shany et al. |

FOREIGN PATENT DOCUMENTS

| | | |
|---|---|---|
| CN | 201103116 | 8/2008 |
| CN | 201531015 | 7/2010 |
| CN | 101956386 | 1/2011 |
| DE | 4237185 | 5/1994 |
| EP | 0033238 | 8/1981 |
| EP | 1762429 | 3/2007 |
| GB | 1383315 | 2/1974 |
| JP | 49-034139 | 3/1974 |
| JP | 49-021946 | 5/1974 |
| JP | 49-062927 | 9/1974 |
| JP | 49-119133 | 11/1974 |
| JP | 2000-170144 | 6/2000 |
| JP | 2001-348562 | 12/2001 |
| JP | 2005-299115 | 10/2005 |

(56) References Cited

FOREIGN PATENT DOCUMENTS

| WO | WO 91/05918 | 5/1991 |
| WO | WO 91/08348 | 6/1991 |
| WO | WO 92/09750 | 6/1992 |
| WO | WO 92/09751 | 6/1992 |
| WO | WO 92/09752 | 6/1992 |
| WO | WO 03/000996 | 1/2003 |
| WO | WO 2004/072413 | 8/2004 |
| WO | WO 2008/023094 | 2/2008 |
| WO | WO 2008/132461 | 11/2008 |
| WO | WO 2011/163383 | 12/2011 |
| WO | WO 2012/011937 | 1/2012 |
| WO | WO 2013/156998 | 10/2013 |
| WO | WO 2016/059637 | 4/2016 |
| WO | WO 2019/021272 | 1/2019 |

OTHER PUBLICATIONS

Interview Summary dated Mar. 26, 2020 from the US Patent and Trademark Office Re. U.S. Appl. No. 15/644,852. (3 pages).

Notification of Office Action dated Apr. 2, 2020 From the State Intellectual Property Office of the People's Republic of China Re. Application No. 201580060860.7 and Its Translation Into English. (35 pages).

Official Action dated Apr. 16, 2020 from the US Patent and Trademark Office Re. U.S. Appl. No. 16/752,824. (25 pages).

Applicant-Initiated Interview Summary dated Dec. 14, 2016 From the US Patent and Trademark Office Re. U.S. Appl. No. 14/394,281 (3 pages).

Applicant-Initiated Interview Summary dated Jun. 19, 2019 From the US Patent and Trademark Office Re. U.S. Appl. No. 15/644,852. (4 pages).

Applicant-Initiated Interview Summary dated Nov. 20, 2018 From the US Patent and Trademark Office Re. U.S. Appl. No. 15/518,494. (3 Pages).

Communication Pursuant to Article 94(3) EPC dated Nov. 3, 2016 From the European Patent Office Re. Application No. 13777827.0. (5 Pages).

Communication Pursuant to Article 94(3) EPC dated Oct. 6, 2017 From the European Patent Office Re. Application No. 13777827.0. (5 Pages).

Communication Pursuant to Article 94(3) EPC dated Oct. 31, 2019 From the European Patent Office Re. Application No. 13777827.0. (4 Pages).

Communication Relating to the Results of the Partial International Search dated Jan. 14, 2016 From the International Searching Authority Re. Application No. PCT/IL2015/051025.

Examination Report dated May 9, 2019 From the Marcas Derecho de Autor Competencia Desleal Trademarks Copyright Unfair Competition Re. Application No. MX/f/2018/000258.

Examination Review Report dated Jan. 21, 2019 From the Intellectual Property Office of Singapore Re. Application No. 11201406559V. (10 pages).

International Preliminary Report on Patentability dated Jan. 3, 2017 From the International Preliminary Examining Authority Re. Application No. PCT/IL2015/051025. (33 pages).

International Preliminary Report on Patentability dated Feb. 6, 2020 From the International Bureau of WIPO Re. Application No. PCT/IL2018/050806. (8 pages).

International Preliminary Report on Patentability dated Oct. 30, 2014 From the International Bureau of WIPO Re. Application No. PCT/IL2013/050325.

International Search Report and the Written Opinion dated Aug. 11, 2013 From the International Searching Authority Re. Application No. PCT/IL2013/050325.

International Search Report and the Written Opinion dated Apr. 12, 2016 From the International Searching Authority Re. Application No. PCT/IL2015/051025.

Notice of Allowance dated Feb. 4, 2019 From the US Patent and Trademark Office Re. U.S. Appl. No. 29/611,603. (10 pages).

Notice of Allowance dated Apr. 16, 2019 From the US Patent and Trademark Office Re. U.S. Appl. No. 29/680,640. (9 pages).

Notice of Allowance dated Jul. 29, 2019 From the US Patent and Trademark Office Re. U.S. Appl. No. 15/518,494. (13 pages).

Notice of Amendment dated Jul. 5, 2018 From the State Intellectual Property Office of the People's Republic of China Re. Application No. 201830031303.9 and Its Translation Into English.

Notice of Eligibility for Grant and Examination Report dated Oct. 19, 2018 From the Intellectual Property Office of Singapore, IPOS Re. Application No. 11201702883T. (5 Pages).

Notice of Intention to Refuse Patent Application and Examination Report dated Oct. 26, 2017 From the Intellectual Property Office of Singapore, IPOS Re. Application No. 11201406559V. (8 Pages).

Notice of Reasons for Rejection dated May 10, 2019 From the Japan Patent Office Re. Application No. 2017-540340 and Its Translation (Summary) Into English. (26 Pages).

Notification of Office Action and Search Report dated Oct. 15, 2018 From the State Intellectual Property Office of the People's Republic of China Re. Application No. 201580060860.7 and Its Summary in English. (14 Pages).

Notification of Office Action and Search Report dated Sep. 28, 2015 From the State Intellectual Property Office of the People's Republic of China Re. Application No. 201380031112.7 and Its Translation of Office Action in English.

Notification of Office Action dated Jun. 3, 2016 From the State Intellectual Property Office of the People's Republic of China Re. Application No. 201380031112.7.

Notification of Office Action dated May 31, 2019 From the State Intellectual Property Office of the People's Republic of China Re. Application No. 201580060860.7 and Its Summary in English. (11 Pages).

Notification of Reason for Rejection dated Sep. 20, 2018 From the Japanese Patent Office Re. Application No. 2018-001323.

Office Action dated Sep. 2, 2018 From the Israel Patent Office Re. Application No. 61534. (3 pages).

Office Action dated Nov. 25, 2018 From the Israel Patent Office Re. Application No. 61534. (2 pages).

Official Action dated Apr. 4, 2019 From the US Patent and Trademark Office Re. U.S. Appl. No. 15/644,852. (32 pages).

Official Action dated Oct. 4, 2018 From the US Patent and Trademark Office Re. U.S. Appl. No. 15/644,852. (32 pages).

Official Action dated Dec. 15, 2017 From the US Patent and Trademark Office Re. U.S. Appl. No. 15/518,494. (18 pages).

Official Action dated Jan. 16, 2020 From the US Patent and Trademark Office Re. U.S. Appl. No. 15/644,852. (18 pages).

Official Action dated Apr. 18, 2019 From the US Patent and Trademark Office Re. U.S. Appl. No. 15/518,494. (33 pages).

Official Action dated Jun. 20, 2017 From the US Patent and Trademark Office Re. U.S. Appl. No. 15/518,494. (15 pages).

Official Action dated Jan. 23, 2017 From the US Patent and Trademark Office Re. U.S. Appl. No. 14/394,281. (23 pages).

Official Action dated Aug. 24, 2016 From the US Patent and Trademark Office Re. U.S. Appl. No. 14/394,281.

Official Action dated Aug. 24, 2018 From the US Patent and Trademark Office Re. U.S. Appl. No. 15/518,494. (19 pages).

Official Action dated Mar. 24, 2016 From the US Patent and Trademark Office Re. U.S. Appl. No. 14/394,281.

Official Action dated Sep. 24, 2015 From the US Patent and Trademark Office Re. U.S. Appl. No. 14/394,281.

Official Action dated Jul. 29, 2019 From the US Patent and Trademark Office Re. U.S. Appl. No. 15/644,852. (18 pages).

Requisition by the Examiner dated Sep. 10, 2019 From the Innovation, Science and Economic Development Canada, Canadian Intellectual Property Office Re. Application No. 2,870,384. (3 Pages).

Requisition by the Examiner dated Nov. 20, 2018 From the Canadian Intellectual Property Office Re. Application No. 179300. (2 pages).

Requisition by the Examiner dated Dec. 28, 2018 From the Innovation, Science and Economic Development Canada, Canadian Intellectual Property Office Re. Application No. 2,870,384. (6 Pages).

(56) References Cited

OTHER PUBLICATIONS

Restriction Official Action dated Nov. 2, 2018 From the US Patent and Trademark Office Re. U.S. Appl. No. 29/611,603. (16 pages).
Search Report and Opinion dated Jan. 28, 2020 From the Servico Publico Federal, Ministerio da Economia, Instituto Nacional da Propriedade Industrial do Brasil Re. Application No. BR112014025728-0 and Its Summary in English. (6 Pages).
Search Report and Written Opinion dated Dec. 1, 2017 From the Intellectual Property Office of Singapore, IPOS Re. Application No. 11201702883T. (10 Pages).
Search Report and Written Opinion dated Jan. 3, 2020 From the Intellectual Property Office of Singapore, IPOS Re. Application No. 10201811334Q. (7 Pages).
Search Report and Written Opinion dated Jul. 31, 2019 From the Intellectual Property Office of Singapore, IPOS Re. Application No. 10201811334Q. (10 Pages).
Supplementary European Search Report and the European Search Opinion dated Nov. 26, 2015 From the European Patent Office Re. Application No. 13777827.0.
Translation dated Jun. 7, 2019 of Notification of Office Action dated May 31, 2019 From the State Intellectual Property Office of the People's Republic of China Re. Application No. 201580060860.7. (12 Pages).
Translation dated Oct. 25, 2018 of Notification of Office Action dated Oct. 15, 2018 From the State Intellectual Property Office of the People's Republic of China Re. Application No. 201580060860.7. (13 Pages).
Translation of Notification of Office Action dated Jun. 3, 2016 From the State Intellectual Property Office of the People's Republic of China Re. Application No. 201380031112.7.
Written Opinion dated Aug. 4, 2015 From the Intellectual Property Office of Singapore Re. Application No. 11201406559V.
Written Opinion dated May 16, 2016 From the Intellectual Property Office of Singapore Re. Application No. 11201406559V.
Written Opinion dated Nov. 28, 2016 From the Intellectual Property Office of Singapore Re. Application No. 11201406559V. (7 Pages).
Written Opinion dated Sep. 28, 2016 From the International Preliminary Examining Authority Re. Application No. PCT/IL2015/051025.
Alamy "Floating Containment Boom", retrieved from alamy.com, 1 Page, 2018.
Alamy "High Seas Oil Containment Boom in the Mediterranean Ocean", retrieved from alamy.com, 1 Page, 2018.
Alibaba "Oil Spill Containment Boom", retrieved from alibaba.com, 1 Page, 2018.
ASTM "Standard Specification for Oil Spill Response Boom Connection: Slide Connector", ASTM International, Designation F 2438-04, p. 1-5, Dec. 2004.
Chinacsw "Harbor Floating Spill Containment Boom", retrieved from chinacsw.com, 1 Page, 2018.
Chinacsw "Silt Curtain, Oil Containment Boom and Oil Spill Containment Berm", retrieved from Chinacsw.com, 1 Page, 2018.
Fang et al. "Optimization of An Oil Boom Arrangement", Proceedings of the International Oil Spill Conference, 2001(2): 1367-1374, Mar. 2001.
Ipieca "The Global Oil and Gas Industry Association for Environmental and Social Issues", retrieved from ipieca.org, 48 Pages, 2015.
Mavideniz "Oil Fence Boom", retrieved from mavideniz.com, 1 Page, 2018.
Nautic Expo "Harbor Boom", retrieved from nauticexpo.com, 1 Page, 2018.
Shutterstock "Containment Boom Temporary Floating Barrier Used Stock Photo", retrieved from Shutterstock.com, 1 Page, 2018.
Advisory Action dated Jun. 8, 2020 from the US Patent and Trademark Office Re. U.S. Appl. No. 15/644,852. (6 pages).
Official Action dated Sep. 21, 2020 from the US Patent and Trademark Office Re. U.S. Appl. No. 15/644,852. (21 pages).
Search Report and Explanations dated Jun. 5, 2020 From the Servico Publico Federal, Ministerio da Economia, Instituto Nacional da Propriedade Industrial do Brasil Re. Application No. BR112017007694-2 and Its Summay in English. (5 Pages).

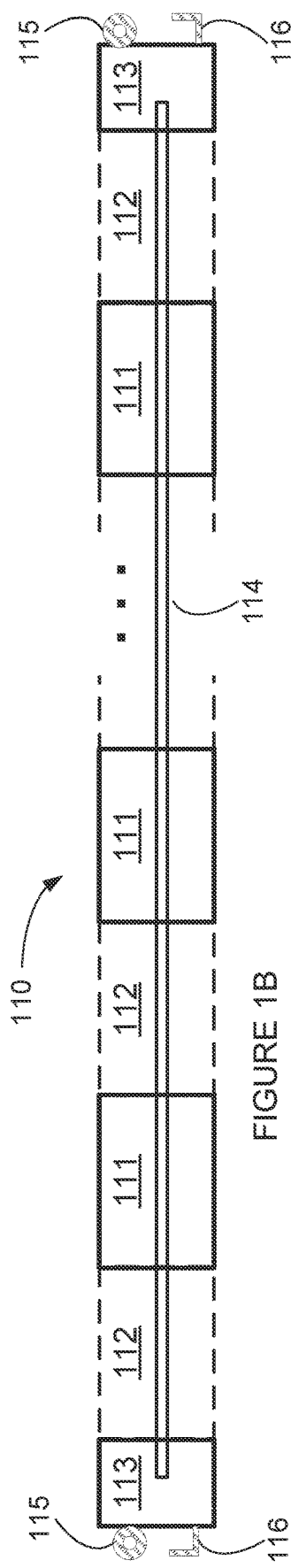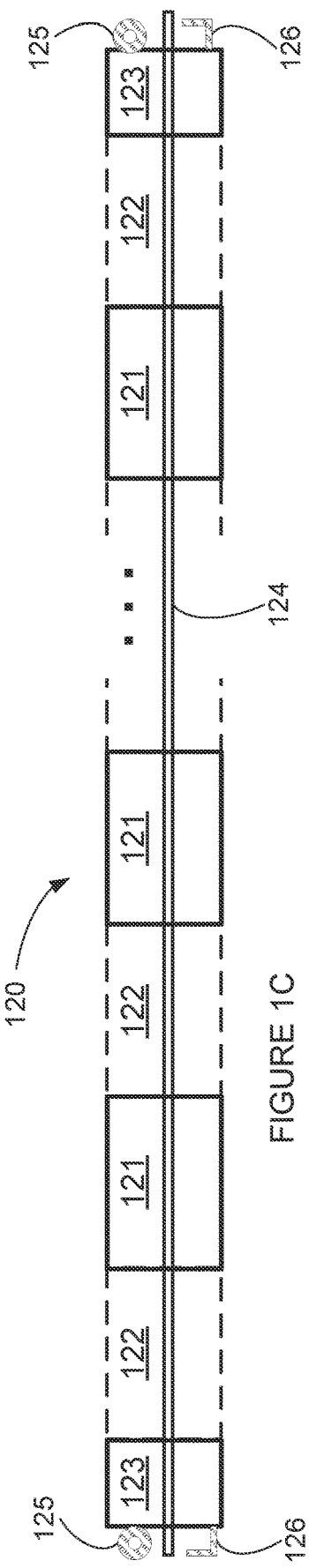

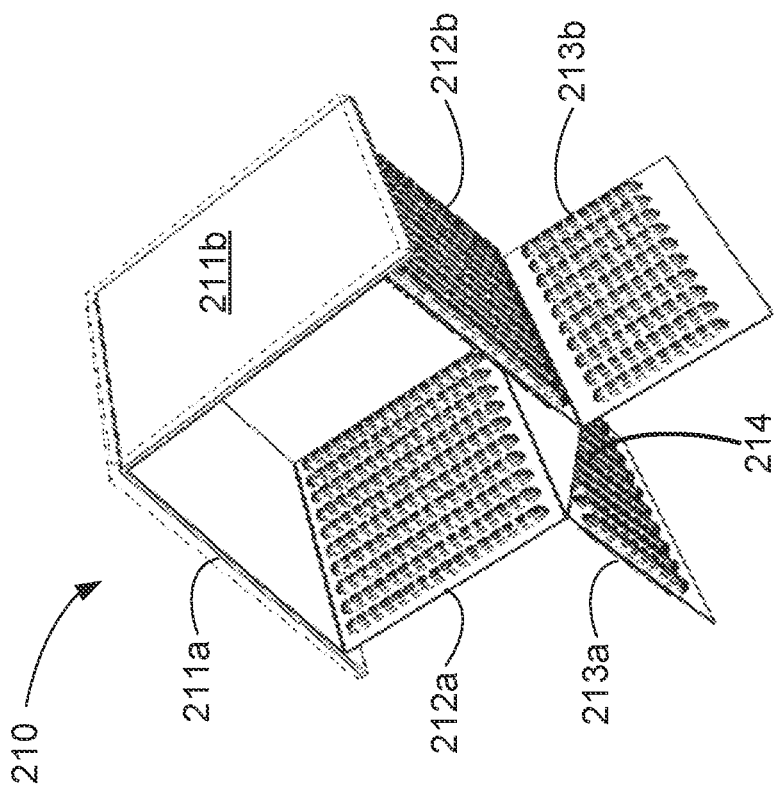
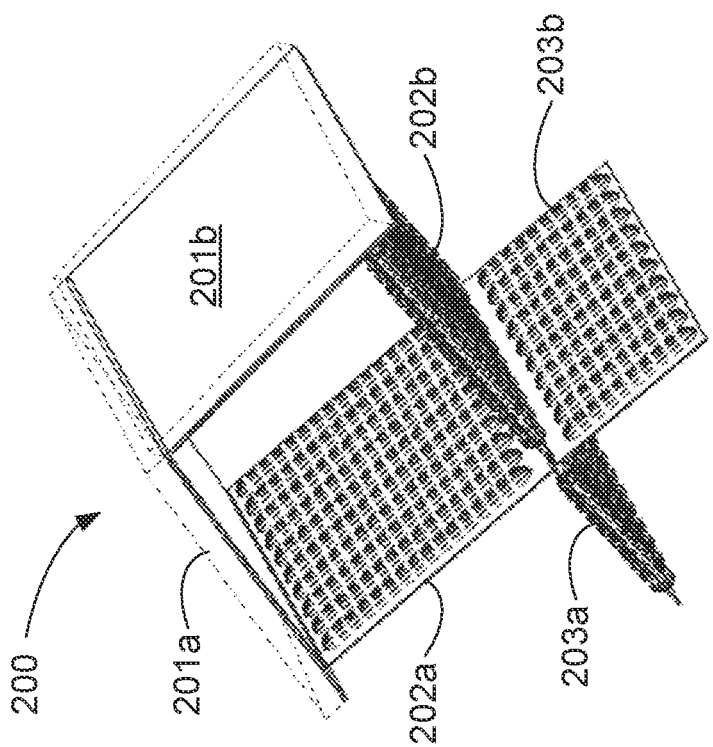
FIGURE 2A
FIGURE 2B

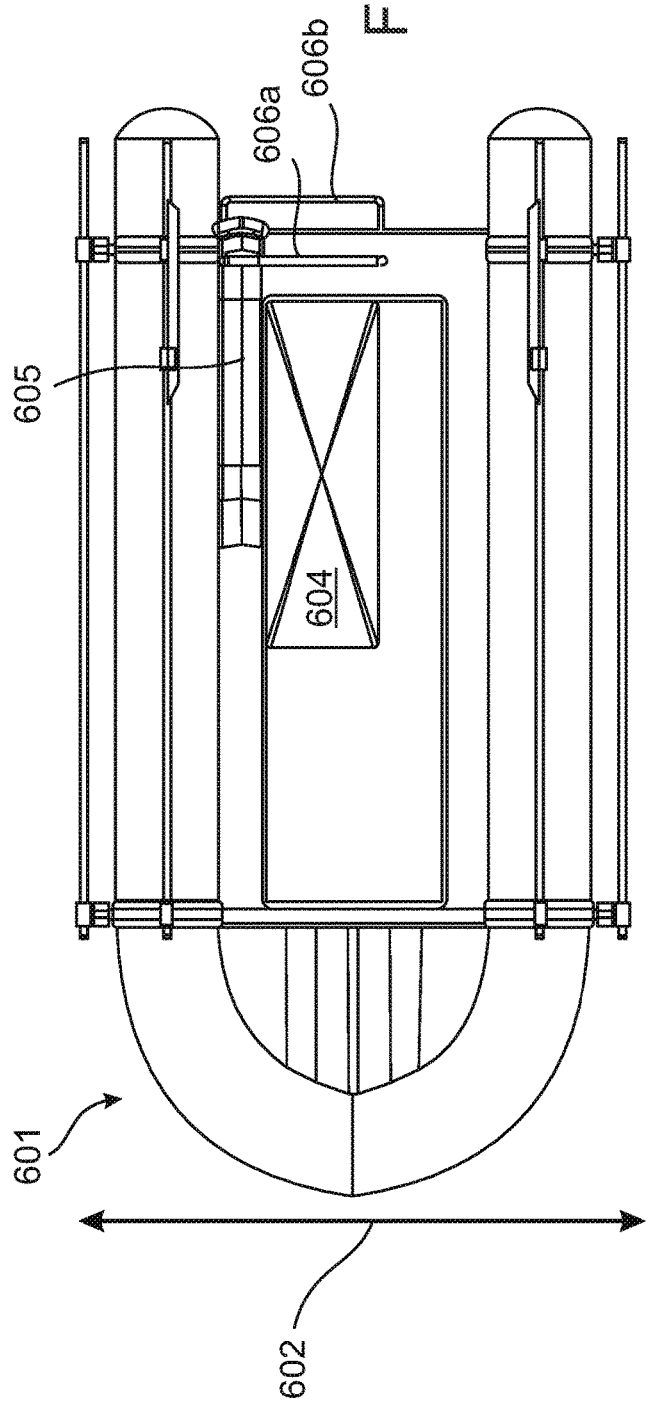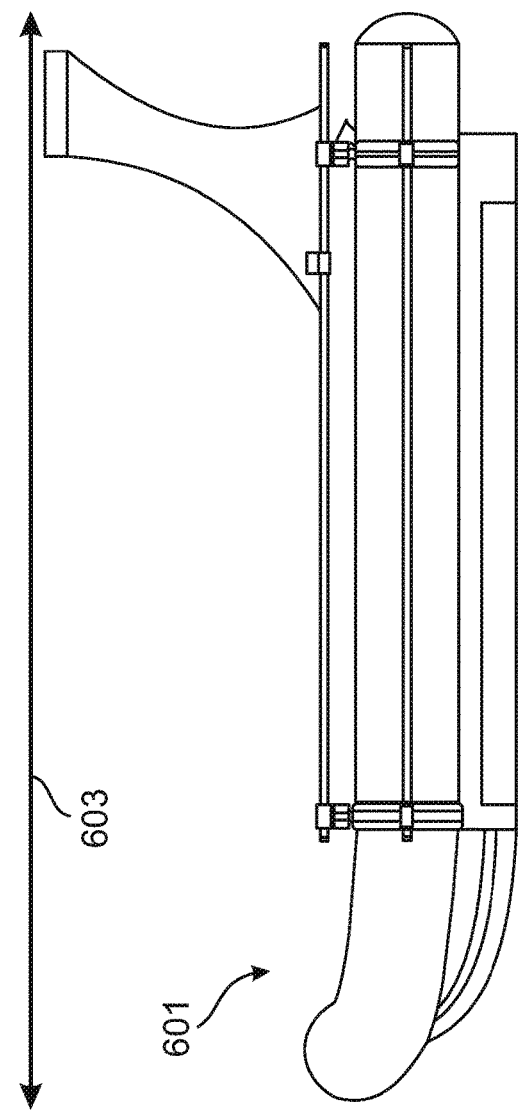

OIL SPILL SPREAD PREVENTION BY IMMEDIATE CONTAINMENT

RELATED APPLICATIONS

This application is a National Phase of PCT Patent Application No. PCT/IL2018/050806 having International filing date of Jul. 20, 2018 which claims the benefit of priority under 35 USC § 119(e) of U.S. Provisional Patent Application No. 62/536,021 filed on Jul. 24, 2017.

The contents of the above applications are all incorporated by reference as if fully set forth herein in their entirety.

FIELD AND BACKGROUND OF THE INVENTION

The present invention, in some embodiments thereof, relates to a spill containment boom and, more particularly, but not exclusively, to a spill containment boom including collapsible units connected by flexible sheets, and also, but not exclusively, to an offshore boom.

Additional background art includes:

PCT patent application publication WO 2016/059637 of Shany et al.; and

PCT patent application publication WO 2013/156998 of Shany et al.

The disclosures of all references mentioned above and throughout the present specification, as well as the disclosures of all references mentioned in those references, are hereby incorporated herein by reference.

SUMMARY OF THE INVENTION

An aspect of some embodiments of the invention includes a spill containment boom for deployment in ambient water, including collapsible units which form hollow floating chambers, connected by flexible sheets. In some embodiments, the spill containment boom includes an elongated tube designed to fold flat when packed, and when unpacked, to self-expand into a hollow elongate shape.

According to an aspect of some embodiments of the present invention there is provided a boom for containing floating material spilled in water including an elongated sheet including units and spaces between the units, each one of the units including a plurality of plates attached to the sheet, designed to fold flat when packed, and to self-expand into a polygonal cross-sectional shape when unpacked.

According to some embodiments of the invention, each one of the units includes at least one lighter-than-water plate. According to some embodiments of the invention, each one of the units includes at least one plate made at least partially of closed cell foam material. According to some embodiments of the invention, each one of the units includes at least one plate having one or more sealed air cavities.

According to some embodiments of the invention, each one of the units includes at least one heavier than water plate. According to some embodiments of the invention, the heavier than water plate is heavier than water only when soaked with water.

According to some embodiments of the invention, the heavier than water plate includes cavities open to entrance of water into the plate. According to some embodiments of the invention, each one of the units includes at least one plate including open cell foam material.

According to some embodiments of the invention, the open cell foam plate is heavier than water when soaked with water. According to some embodiments of the invention, the open cell foam plate is as heavy as water when soaked with water.

According to some embodiments of the invention, further including a sponge attached to a unit between a first plate and a neighboring second plate, designed to expand in water and open an angle between the first plate and the second plate.

According to some embodiments of the invention, further including a strap attached to the first plate and to the second plate designed to limit the angle which the sponge opens between the first plate and the second plate.

According to some embodiments of the invention, at least some of the units further include at least one additional plate attached to an edge of the heavier than water plate.

According to some embodiments of the invention, the additional plate is heavier than water.

According to some embodiments of the invention, the additional plate is heavier than water only when soaked with water.

According to some embodiments of the invention, the additional plate is made of made of open cell foam material.

According to some embodiments of the invention, further including a sponge attached to a unit between a heavier-than-water plate and an additional plate, designed to expand in water and open an angle between the heavier-than-water plate and the additional plate.

According to some embodiments of the invention, further including a string attached to the heavier-than-water plate and to the additional plate designed to limit the angle which the sponge opens between the heavier-than-water plate and the additional plate.

According to some embodiments of the invention, the sponge includes an open cell material. According to some embodiments of the invention, the sponge includes a closed cell material.

According to some embodiments of the invention, a unit is designed to open into a shape with a polygonal cross section of an area between 500 and 2500 square centimeters.

According to some embodiments of the invention, the boom includes a plurality of units.

According to some embodiments of the invention, the elongated sheet has a shape of a hollow tube. According to some embodiments of the invention, the elongated sheet has a shape of a hollow polygon. According to some embodiments of the invention, the elongated sheet includes a plurality of holes.

According to some embodiments of the invention, the boom further includes a strengthening strap along an entire length of the boom.

According to some embodiments of the invention, the strengthening strap includes a material selected from a group consisting of Endumax, Kevlar, Nomex, Nylon and Cordura.

According to some embodiments of the invention, the boom weighs less than 1 kilogram per meter length when not soaked with water. According to some embodiments of the invention, the boom weighs less than 0.65 kilogram per meter length when not soaked with water.

According to some embodiments of the invention, the boom is light enough to be pushed by a layer of floating oil having a thickness of 0.5 centimeter.

According to some embodiments of the invention, including a first end plate attached to a first end of the elongated sheet and a second end plate attached to a second end of the elongated sheet.

According to some embodiments of the invention, the first end plate includes a connector designed to connect to a mating connector included in the second end plate.

According to some embodiments of the invention, the first end plate and the second end plate are designed to self-align when placed next to each other.

According to some embodiments of the invention, the first end plate and the second end plate are designed to self-align when placed parallel to each other.

According to some embodiments of the invention, the first end plate includes a connector designed to be guided by a magnet to connect to a mating connector included in the second end plate.

According to some embodiments of the invention, the plates are folded over each other and the boom is packaged in a moisture proof cartridge.

According to some embodiments of the invention, the plates are folded over each other in a zig-zag fashion.

According to some embodiments of the invention, further including several cartridges, each packaging a boom section, packaged in a waterproof pod.

According to an aspect of some embodiments of the present invention there is provided a method for limiting spread of a spill of a floating substance spilled into water, including a) providing a first boom section which includes at least one foldable elongated sheet which includes foldable units, packed in a cartridge and designed to self-expand to a hollow shape when unpacked, and b) using a deployment craft to navigate around the spill while unpacking and releasing the units of the first boom section, thereby deploying the first boom section around at least a portion of the spill, which limits spread of the spill.

According to some embodiments of the invention, the deploying the first boom section around at least a portion of the spill is performed using no specific boom deployment equipment other than a boom cartridge.

According to some embodiments of the invention, further including releasing the units at a rate which does not drag the first boom along the water.

According to some embodiments of the invention, the deployment craft is a lifeboat.

According to some embodiments of the invention, the deployment craft is a service boat.

According to some embodiments of the invention, the deployment craft is an inflatable dinghy.

According to some embodiments of the invention, the deployment craft is an inflatable vessel of 3 meter length. According to some embodiments of the invention, the deployment craft is a craft designated for carrying a load of less than 500 kilograms.

According to some embodiments of the invention, the deployment craft carries only one person.

According to some embodiments of the invention, further including anchoring an end of the first boom to a sea anchor.

According to some embodiments of the invention, the deploying the first boom around at least a portion of the spill includes deploying the first boom using only one deployment craft.

According to some embodiments of the invention, further including anchoring an end of the first boom to a second deployment craft.

According to some embodiments of the invention, further including connecting a second boom at an end of the first boom.

According to some embodiments of the invention, further including connecting an end of the first boom to an end of a boom, thereby completing an encirclement of the spill.

According to some embodiments of the invention, further including leaving a deployed boom to float freely with the spill.

According to an aspect of some embodiments of the present invention there is provided a method for packaging a containment boom including providing a containment boom including an elongated sheet including units and spaces between the units, each one of the units including a plurality of plates attached to the sheet, designed to fold flat when packed, providing a cartridge having a cross sectional area large enough to accept a unit when the unit is folded flat, packaging the units flat one on top of the other and folding a portion of the elongated sheet which is in the spaces between the units to fit into the cartridge.

According to some embodiments of the invention, the packaging the units flat one on top of the other includes packaging an elongated sheet which is in a space between a second unit and a third unit on an opposite side of the cartridge as an elongated sheet which is in a space between a first unit and the second unit.

According to some embodiments of the invention, the packaging the units flat one on top of the other includes packaging an elongated sheet which is in a space between a first unit and a second unit at least partly between a plate of the first unit and a plate of the second unit.

According to an aspect of some embodiments of the present invention there is provided a cartridge containing a containment boom including an elongated sheet including units and spaces between the units, each one of the units including a plurality of plates attached to the sheet, designed to fold flat when packed, wherein the units are packaged flat one on top of the other.

According to some embodiments of the invention, the elongated sheet which is in a space between a second unit and a third unit is placed on an opposite side of the cartridge as an elongated sheet which is in a space between a first unit and the second unit.

According to some embodiments of the invention, the elongated sheet which is in a space between a first unit and a second unit is packaged at least partly between a plate first unit and a plate of the second unit.

According to an aspect of some embodiments of the present invention there is provided a method of connecting sections of a boom to each other, the method including grasping an end of a first boom section, grasping an end of a second boom section, aligning the end of the first boom section with the end of the second boom section so that connectors on the end of the first boom section align with connectors on the end of the second boom section, mating the connectors on the end of the first boom section with the connectors on the end of the second boom section, thereby connecting the first boom section to the second boom section.

According to some embodiments of the invention, the aligning the end of the first boom section with the end of the second boom section includes placing the end of the first boom section parallel to the end of the second boom section and allowing a self-alignment between the end of the first boom section and the end of the second boom section.

According to some embodiments of the invention, the mating includes enabling magnets to pull the connectors on the end of the first boom section toward the connectors on the end of the second boom section.

According to some embodiments of the invention, the grasping the end of the first boom section includes hooking the end of the first boom section with a grappling hook.

According to some embodiments of the invention, the hooking the end of the first boom section with a grappling hook includes inserting an end of the grappling hook into a loop at the end of the first boom section.

According to an aspect of some embodiments of the present invention there is provided a method for limiting spread of an off-shore spill of a floating substance spilled into water, including a) providing a first section of an off-shore boom which includes at least one foldable elongated sheet which includes foldable units, packed in a cartridge and designed to self-expand to a hollow shape when unpacked, and b) using a deployment craft to navigate around the off-shore spill while unpacking and releasing the units of the first section of the off-shore boom, thereby deploying the first section of the off-shore boom around at least a portion of the off-shore spill, which limits spread of the off-shore spill.

According to an aspect of some embodiments of the present invention there is provided a kit for containing floating material spilled in water including a boom including an elongated sheet including units and spaces between the units, each one of the units including a plurality of plates attached to the sheet, designed to fold flat when packed, and to self-expand into a polygonal cross-sectional shape when unpacked, and a boom deployment chute.

According to some embodiments of the invention, further including a frame for connecting the boom deployment chute to a deployment vessel.

According to some embodiments of the invention, the boom deployment chute includes a slide. According to some embodiments of the invention, the slide is a perforated slide.

According to some embodiments of the invention, the boom deployment chute includes an adapter shiftable between two states, each one of the states configured to deploy a boom from a different one of at least two boom section cartridges.

According to some embodiments of the invention, the boom deployment chute includes an adapter shiftable between two states, each one of the states configured to deploy a boom from a different one of at least two side-by-side boom section cartridges.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings and images. With specific reference now to the drawings and images in detail, it is stressed that the particulars shown are by way of example and for purposes of illustrative discussion of embodiments of the invention. In this regard, the description taken with the drawings and images makes apparent to those skilled in the art how embodiments of the invention may be practiced.

In the drawings:

FIG. 1B is a simplified block diagram illustration of a boom according to an example embodiment of the invention;

FIG. 1C is a simplified block diagram illustration of a boom according to an example embodiment of the invention;

FIG. 2A is a simplified illustration of a unit of a boom according to an example embodiment of the invention;

FIG. 2B is a simplified illustration of a unit of a boom according to an example embodiment of the invention;

FIGS. 6A and 6B are simplified illustrations of a small vessel for deploying a boom according to an example embodiment of the invention;

DESCRIPTION OF SPECIFIC EMBODIMENTS OF THE INVENTION

Figure 1A:
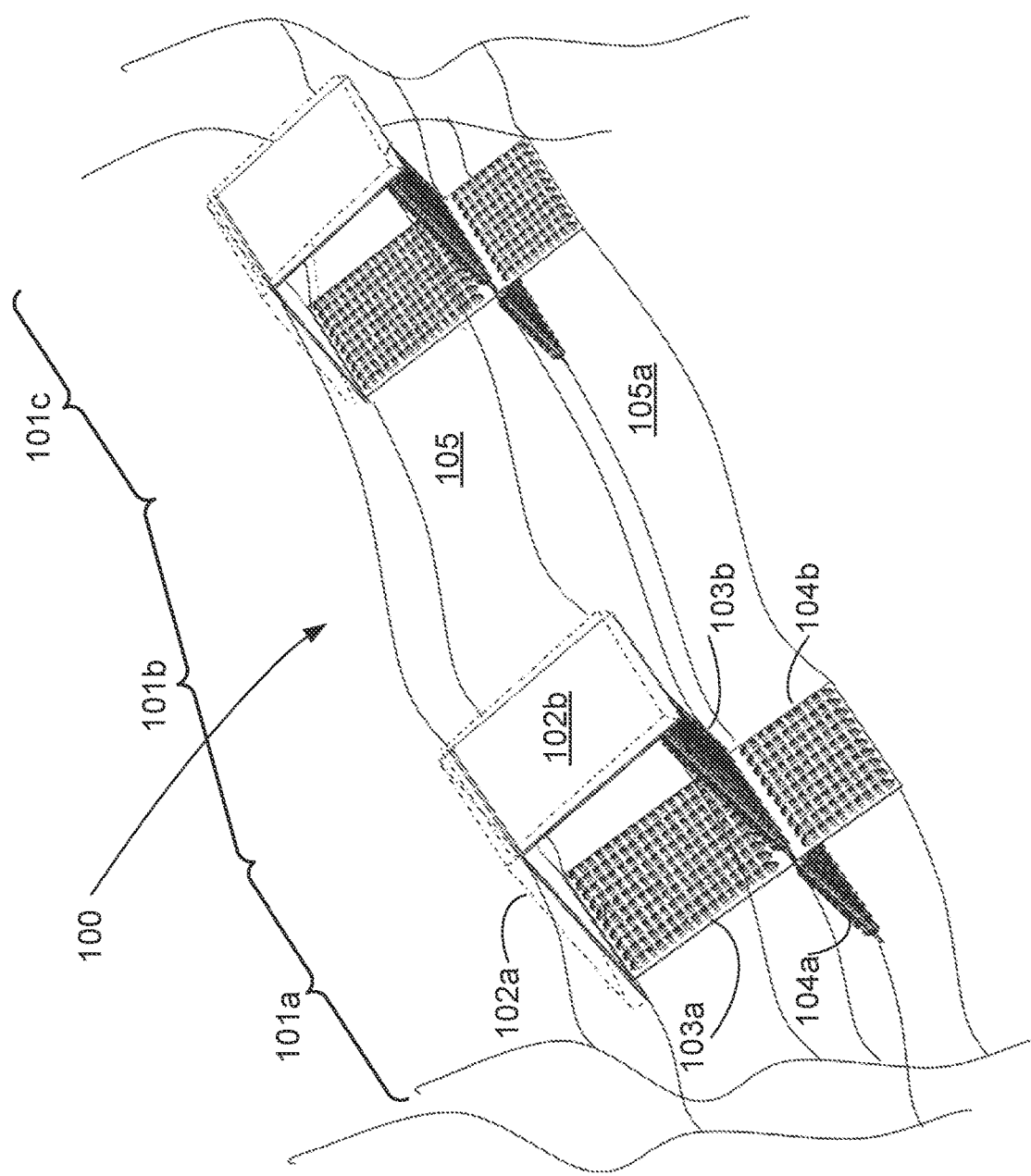
FIG. 1A is a simplified illustration of a portion of a boom according to an example embodiment of the invention.

The present invention, in some embodiments thereof, relates to a spill containment boom and, more particularly, but not exclusively, to a spill containment boom including collapsible units connected by flexible sheets, and also, but not exclusively, to an offshore boom.

An aspect of some embodiments of the invention includes a spill containment boom for deployment in ambient water, including collapsible units which form hollow floating chambers, connected by flexible sheets. In some embodiments, the spill containment boom includes an elongated tube designed to fold flat when packed, and when unpacked, to self-expand into a hollow elongate shape.

An aspect of some embodiments of the invention includes the boom being collapsible, optionally is foldable, to be compactly stored at locations where a spill may happen without taking up too much room. When a spill does happen, the boom may be deployed at the location, potentially saving transportation time and transportation expense at a time of need.

An aspect of some embodiments of the invention includes the boom being light, in terms of weight per unit length. In some embodiments, the boom is light enough to be deployed by one person. In some embodiments, the boom is light enough for a sea anchor to pull out of a boat being driven away from the sea anchor. Prior art offshore booms are typically about 0.5-2 meters in height, and weigh about 5-10 kilograms per meter.

In some embodiments a length of the floating flexible boom can potentially prevent entrainment, which is a leaking of an oil spill beyond the boom. In some embodiments the flexible boom which follows vertical movement of water, such as waves, can potentially float on wave crests, preventing waves from transferring oil over the floating boom. In some embodiments the flexible boom which follows vertical movement of water, such as waves, can float inside wave troughs, preventing wave troughs from transferring oil beneath the floating boom.

Some potential advantages of a boom which is light and flexible are now listed:

in some embodiments the boom may float on water, preventing spread of an oil spill and at the same time be free floating with the oil spill so as to potentially contain the oil spill without fighting currents or winds;

in some embodiments the floating flexible boom can potentially prevent entrainment, which is a leaking of an oil spill beyond the boom. In some embodiments the flexible boom which follows vertical movement of water, such as waves, can potentially float on wave crests, preventing waves from transferring oil over the floating boom. In some embodiments the flexible boom which follows vertical movement of water, such as waves, can float inside wave troughs, preventing wave troughs from transferring oil beneath the floating boom.

in some embodiments the lightweight floating flexible boom is potentially light enough to have an oil spill push the boom enough to prevent an encircling boom from closing in upon itself, from cutting an encompassing shape of a deployed boom into two or more separate areas.

It is noted that an embodiment of the floating flexible boom was tested for entrainment under various wind conditions.

In typical booms, the higher the wind, the greater the likelihood of entrainment. Where standard oil spill containment booms typically prevent entrainment at winds up to 0.5 knots, an embodiment of the floating flexible boom prevented entrainment at winds up to 0.8 knots.

It is noted that an embodiment of the floating flexible boom was tested for oil spill containment, and a boom of 30 meters length surrounded and contained 1.5 tons of oil, which was a layer of 3 inches in depth.

Some potential advantages of a boom which is collapsible into a compact shape which can be stored at locations where a spill may happen without taking up too much room are now listed:

in some embodiments the boom is conveniently stored at locations where a spill is likely to happen, and so enables local crew to deploy the boom rapidly, potentially preventing spread of the spill over time;

in some embodiments the boom is deployed by one or two crew members, without boom-deploying machinery, without lengthy boom-deploying training, potentially enabling local crew to deploy the boom rapidly, potentially preventing spread of the spill over time.

Some potential advantages of a boom produced and deployed according to example embodiments of the invention include a resistance to being raised from the water by wind. Some properties of some example embodiments of the boom which potentially enable resistance to the wind include one or more of: a low height above the surface of the water; heavier than water components below surface of the water; flexible sheets in an open angle, optionally an upside-down V shape, with ends of the V shape below the surface of the water.

An aspect of some embodiments of the invention includes a floating boom shaped as an elongated open tube, designed to fold flat when packed, and when unpacked, to self-expand into a floating sleeve.

In some embodiments, the sleeve has a polygonal cross-sectional shape, provided by rigid or semi-rigid plates attached to and extending along a portion of a length of the sleeve.

A section of the sleeve which includes plates is named, in the present specification and claims, a unit or a cell.

In some embodiments, a section of the boom includes many units, with the units flexibly connected to each other by the section of the boom being made of one or more long flexible sheets extending between the units. In some embodiments the sheet(s) optionally extend along an entire length of the section of the boom.

In some embodiments the boom incudes a connector at each end of a section of the boom. In the present specification and claims a section of a boom with a connector at each end is sometimes named a boom section, or a section of a boom. In some embodiments a boom includes several boom sections connected end-to-end, and a person skilled in the art will understand when the term boom is used to describe a single section, and when the term boom is used to describe a boom including several sections connected end-to-end.

In some embodiments, some of the plates, or some parts of the plates, are lighter than water, providing floatation. In some embodiments, the lighter than water plates are made of closed cell foam or include closed cell foam.

In some embodiments, some of the plates are designed to be as heavy as water, or heavier than water, designed to sink into water and to pull at least a portion of a circumference of the cross section of the boom under water. In some embodiments, the plates designed to be heavier than water are designed to be heavier than water only when deployed into water, and be lighter than water prior to deployment. In some embodiments, the plates designed to be heavier than water are made of open cell foam, which soaks up water when deployed in water, and becomes heavier.

In some embodiments the plates are made of rigid or semi-rigid material such as plastic, with cavities in the plate. In some embodiments a cavity opening is optionally sealed by an additional material such as a foam or a film, sealing the cavity with air inside, adding to floatation power of the plate and boom. In some embodiments the cavities are left open to fill with water. In some embodiments holes are produced in the sealing film or foam to allow water inside.

In some embodiments a plate is formed by joining two or more materials, for example a semi rigid plastic plate, optionally with open cavities as mentioned above, attached to a flat foam or plastic film material which adheres to the plate and seals the cavities like a lid.

An aspect of some embodiments of the invention includes using one or more sponge(s) at corners of the plates, so that when the sleeve is deployed in water the sponge(s) absorb water, expand (up to 20 times their original compressed volume) and push the plates, expanding the boom into an open, optionally polygonal shape. In some embodiments there are one or more sponge(s) at internal corners of the polygonal shape, which absorb water and push plates of the boom away from each other, expanding the boom into a polygonal shape. In some embodiments there are one or more sponge(s) at external corners of the polygonal shape, which absorb water and push plates of the boom away from each other, expanding the boom into a polygonal shape.

In some embodiments, a boom section has at least one strengthening strap 106 (not shown) along its length. In some embodiments the strengthening strap is along an entire length of the boom section. In some embodiments the strengthening strap is made of a material which is flexible and tear and/or cut and/or abrasion resistant. In some embodiments the strengthening strap is made of a fabric material such as, by way of some non-limiting examples, Endumax, Kevlar, Nomex, Nylon and Cordura.

In some embodiments, the strap is also connected to a connector at an end of the boom section, so that when the connectors are connected to each other, the strap provides continuous strength to a boom which includes several boom sections.

In some embodiments, the strap is longer than a boom section, and extends beyond an end of a boom section.

In some embodiments, the strap is longer than a boom section, and extends beyond a connector at an end of the boom section.

In some embodiments, the elongated sleeve forms an additional flap along its length, the additional flap optionally including plates extending along at least a portion of a length of the sleeve, optionally also including portions designed to soak up water, to be heavier than water when soaked, to pull at least a portion of a circumference of the cross section of the sleeve under water. Further details are described with reference to FIG. 1A reference number 105a and equivalent components in other drawings.

In some embodiments, the boom forms more than one additional flap along its length. In some embodiments the additional flaps form an upside down V shape designed to soak up water, to be heavier than water when soaked, to pull at least a portion of a circumference of the cross section of the sleeve under water.

In some embodiments, the boom weighs less than 750 grams per meter length when not soaked in water. In some embodiments, the boom weighs in a range of 450 grams to 650 grams and/or even 750 grams per meter length when not soaked in water.

In some embodiments, a cartridge containing 150 meters of the boom weighs 100 kilograms including the cartridge.

In some embodiments, an area of the polygonal cross section of the boom is between 500 and 2500 square centimeters.

In some embodiments, a boom section of 25 meter length is packaged in one package or cartridge. In some embodiments, a boom section of 50, 100, 150 or other custom lengths in a range between 20 meters and 300 meters is packaged in one package or cartridge.

In some embodiments, the boom has a buoyancy-to-weight ratio of 1:5. In some embodiments the boom has a buoyancy-to-weight ratio of 1:5, 1:6, 1:7, 1:8, 1:9, 1:10, 1:11, 1:12, 1:13, 1:14, 1:15 and intermediate values.

In some embodiments, the connectors designed to connect sections of the boom to each other are designed to connect with a simple motion, which can be performed by unskilled personnel under conditions of a wavy sea.

In some embodiments, the connectors include a magnet which guides the connectors to their closed position, potentially assisting connecting two connectors in a moving boat and/or a wavy sea, potentially making the connection easier, potentially reducing need for training personnel to connect sections of a boom.

In some embodiments, the connectors designed to connect sections of the boom to each other are designed to connect with a sea anchor. In some embodiments, the sea anchor is designed to include a connector for mating with a connector at an end of a boom section.

In some embodiments, the connectors designed to connect sections of the boom to each other are designed to connect with a connector on a ship, a pier or a buoy.

An aspect of some embodiments of the invention includes a method of deployment of the boom. In some embodiments the boom is a foldable elongated tube which includes foldable units, packed in a cartridge and designed to self-expand to a hollow tube when being unpacked and deployed in water. The cartridge is optionally carried in a small vessel or boat, and deployed by unpacking and releasing the units of the elongated tube in the water while navigating the vessel around a spill.

In some embodiments, the boom is released at a large enough rate so that movement of the deployment vessel does not drag the boom.

In some embodiments, sections of the boom are connected to each other, to form a longer boom.

In some embodiments, one end of the boom is connected to another end of the boom, forming an encirclement of a spill.

In some embodiments, the boom floats freely, not anchored to a bottom of a body of water.

In some embodiments, the boom floats freely, not anchored to a boat.

In some embodiments, the boom floats freely, anchored to one or more sea anchor(s).

In some embodiments, the boom is deployed using a single deployment vessel.

In some embodiments, the boom is deployed using a lifeboat or a service boat.

In some embodiments, the boom is deployed using an inflatable dinghy. In some embodiments, the boom is deployed by a small boat.

In some embodiments, a sea anchor is used to anchor one end of the boom or an end of a section of the boom.

In some embodiments, the boom is deployed using no equipment other than one or more cartridges in which the boom is packaged.

In some embodiments the boom is optionally deployed by unskilled personnel, just by unpacking the boom and placing it on the water around a spill. In some embodiments, personnel which have had less than 15 minutes of training, optionally on how to deploy the boom without dragging over the water and/or on how to connect sections of the boom.

In some embodiments, the boom sections are connected to each other, using a connector which is designed to guide two sides of a connection to each other. In some embodiments, the boom sections are connected to each other, using a connector which is designed to two sides of the connections to each other.

In some embodiments, the boom is deployed by only one person on a deployment vessel.

An aspect of some embodiments of the invention includes a method of packaging a section of the boom in a boom cartridge.

In some embodiments the boom is packaged in a box, termed a cartridge, as flat units connected to each other, for deployments as a flexible elongated tube.

In some embodiments the boom is packaged in a cartridge as flat units connected to each other at alternating sides of the cartridge, optionally for deployment from the cartridge in a zigzag fashion.

An aspect of some embodiments of the invention includes a method of connecting sections of the boom to each other.

In some embodiments at least one end of a boom section is connected to the cartridge. Such a connection potentially prevents the boom section being pulled out of the cartridge and into water, causing an operator to lose control, at least temporarily, of the end of the boom section. In some embodiments the cartridge includes a connector corresponding to, or mating with, one or more connectors of an end of a boom section.

In some embodiments sections of the boom are connected to each other by a connector designed to guide two sides of the connector to each other.

In some embodiments sections of the boom are connected to each other by a connector designed to guide two sides of the connector to each other by sliding along specific guiding surfaces. In some embodiments sections of the boom are connected to each other by a connector designed to guide two sides of the connector to each other by magnets designed to pull the two sides of the connector to mate correctly. In some embodiments when the two sides mate correctly the connector is locked and cannot be opened by pulling the two sides of the connector away from each other. In some embodiments the connector can be unlocked by pulling the two sides away from each other in a direction perpendicular to a force which may be produced by pulling two sections of the boom away from each other. In some embodiments the connector can be unlocked by releasing a safety catch.

In some embodiments, the connectors are designed to self-align when placed next to each other. In some embodiments, the connectors are designed to self-align when placed parallel to each other. In some embodiments, the connectors are designed with one or more ridge(s) or a profile which guides the connectors to each other.

In some embodiments an end of the boom is attached to a rigid plate, and one or more connectors are attached to the rigid plate.

In some embodiments all the connectors of a first rigid plate can be connected to all the connectors of a second rigid plate in one movement of placing the two rigid plates correctly next to each other.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1A, which is a simplified illustration of a portion of a boom according to an example embodiment of the invention.

FIG. 1A shows a portion of a boom 100 spread out as if deployed.

The boom 100 includes units 101*a* 101*c* connected to each other by flexible sections 101*b* including a flexible sheet 105. FIG. 1A illustrates the boom 100 as if floating on wavy water with the section 101*b* including the flexible sheet 105 bending with the waves.

In some embodiments, the sections 101*b* are longer than the units 101*a* 101*c*. In some embodiments, the sections 101*b* are a same length as the units 101*a* 101*c*. In some embodiments, the sections 101*b* are shorter than the units 101*a* 101*c*.

In some embodiments the boom 100 is flexible, able to float on wavy water and bend with the waves in an up and down direction.

In some embodiments the boom 100 is flexible, able to float on wavy water and bend with the waves in a side to side direction.

In some embodiments the boom 100 is flexible, able to float on wavy water and bend with the waves in all directions, and specifically both in in an up and down direction and in a side to side direction.

In some embodiments a unit 101*a* 101*c* of a shape shown in the example embodiment of FIG. 1A is optionally made of plates 102*a* 102*b* 103*a* 103*b* and optionally also additional plates 104*a* 104*b*. In some embodiments a shape formed by four plates 102*a* 102*b* 103*a* 103*b* is optionally of a square, or a rectangle, or a rhombus, or a rhomboid In some embodiments the plates 102*a* 102*b* 103*a* 103*b* 104*a* 104*b* are flat.

In some embodiments the upper plates 102a 102b are made of a closed cell foam material, to be light, optionally lighter than water.

In some embodiments the upper plates 102a 102b are made of a closed cell foam material attached to rigid plates, optionally attached to rigid plastic plates. In some embodiments the upper plates 102a 102b are made of a closed cell foam material attached on an outer side of a unit 101a to the rigid plates.

In some embodiments the rigid plates are made by vacuum forming plastic plates. In some embodiments the rigid plates include ridges and troughs, so that when the boom 100 is folded flat, with the plates against each other, the ridges and troughs interleave, and a resulting thickness of the folded boom 100 is reduced.

In some embodiments lower plates 103a 103b are made of an open cell foam material, to be light, yet when immersed in water, to soak up the water and become heavier, optionally as heavy as or heavier than water.

In some embodiments the cell foam material is made by vacuum forming cell foam material. In some embodiments the cell foam shape include ridges and troughs, so that when the boom 100 is folded flat, with the plates against each other, the ridges and troughs interleave, and a resulting thickness of the folded boom 100 is reduced.

In some embodiments optional additional plates 104a 104b are attached at a vertex made by a meeting of the lower plates 103a 103b.

In some embodiments the additional plates 104a 104b are made of an open cell foam material, to be light, yet when immersed in water, to soak up the water and become heavier, optionally heavier than water.

In some embodiments the sheet 105 is continuous along a section of a boom 100.

In some embodiments the sheet 105 is shaped as a tube. In some embodiments the sheet 105 is shaped as a tube with one or more additional flap(s) 105a, optionally attached to one or more additional plates 104a 104b.

In some embodiments the sheet 105 is attached to the units 101a 101c, forming, when expanded, a tube corresponding to the form shaped by the plates 102a 102b 103a 103b.

In some embodiments the sheet 105 105a is also attached to the additional plates 104a 104b, forming a tube with one or more additional flap(s) 105a below the tube.

In some embodiments the plates are optionally shaped to include ridges alternately arranged relative to a neighboring plate. When a unit is packaged, the ridges fit into valleys between the ridges of a neighboring plate, potentially enabling to package a unit while taking up less height in a package/cartridge.

By way of a non-limiting example, the top plates 102a 102b optionally have ridges placed opposite valleys between ridges in the lower plates 103a 103b, so that when packaged, the alternating ridges and valleys fit into each other, interleaving the ridges.

By way of another non-limiting example, the lower plates 103a 103b optionally have ridges placed opposite valleys between ridges in the additional plates 104a 104b, so that when packaged, the alternating ridges and valleys fit into each other, interleaving the ridges.

In some embodiments a thickness of a unit, when packaged with the plates against each other is 18 millimeters. In some embodiments a thickness of a unit, when packaged with the plates against each other is in a range between 16 millimeters and 20 and even 25 millimeters.

In some embodiments, the sheet 105 105(*a*) has at least one strengthening strap (not shown in FIG. 1A, shown as reference 114 in FIG. 1B) along its length. In some embodiments the strengthening strap is made of a material which is flexible and tear and/or cut and/or abrasion resistant. In some embodiments the strengthening strap is made of a fabric material such as, by way of some non-limiting examples, Endumax, Kevlar, Nomex, and Cordura.

In some embodiments the boom 100 optionally includes a radar reflector such as a foil strip or strips attached to the boom 100, to enable detecting the boom 100 by reflection of a radar signal.

When deployed, part of the boom 100 juts above water, potentially preventing small waves breaking over the boom 100 and carrying oil with them. In some embodiments the boom 100 protrudes 4 inches, or 10 centimeters above the water. In some embodiments the boom 100 protrudes above water a height in a range of 2 inches to 10 inches above the water.

When deployed, part of the boom 100 lies under water, potentially preventing oil from passing underneath the boom 100. In some embodiments the boom 100 reaches 8 inches, or 20 centimeters below the surface of the water. In some embodiments the boom reaches under water a depth in a range of 4 inches to 24 inches below the surface of the water.

Reference is now made to FIG. 1B, which is a simplified block diagram illustration of a boom according to an example embodiment of the invention.

FIG. 1B shows a boom 110 made of units 111 connected to each other by spaces 112 where a flexible sheet connects the units 111.

In some embodiments the flexible sheet is a continuous sheet along a section of the boom 110, connecting several units 111 and spanning several spaces 112.

In some embodiments the boom 110 includes a large number of units 111 and spaces 112.

In some embodiments one or both ends of the boom 110 include a connecting plate 113.

In some embodiments the connecting plate 113 may be used to connect an end of the boom 110 to an end of another boom 110, thereby constructing a longer boom 110.

In some embodiments the connecting plate 113 may be used to connect an end of the boom 110 to an anchoring device, in order to hold one end of the boom 110 in place while the boom is being deployed. The anchoring device may be, by way of some non-limiting examples: a sea anchor; a boat; a ship; a pier; a quay; an oil rig; and a real, non-sea anchor.

In some embodiments the boom 110 optionally includes a continuous strap 114 along the section of the boom 110, connecting one end of the section of the boom 110, optionally one connecting plate 113, to another end of the section of the boom 110, optionally another connecting plate 113.

In some embodiments the connecting plate 113 optionally includes a hook or a loop which may be used to grasp or to hook or gaff an end of the boom 110.

In some embodiments the connecting plate 113 optionally includes a ring 115 or a hook 116 for attaching an end of the boom 110 to another end of the same or another boom 110, thereby completing an encirclement of a material spill.

In some embodiments the boom 110 and/or the anchoring device optionally includes one or more of: a GPS component and a transmitter for transmitting a location of the boom 110; a homing transmitter; one or more emergency light(s); and a radar reflector such as foil and/or a corner reflector.

In some embodiments the connecting plate 113 may be used to connect an end of the boom 110 to another end of the boom 110, thereby completing an encirclement of a material spill.

Reference is now made to FIG. 1C, which is a simplified block diagram illustration of a boom according to an example embodiment of the invention.

FIG. 1C shows a boom 120 made of units 121 connected to each other by spaces 122 where a flexible sheet connects the units 121. In some embodiments the flexible sheet is a continuous sheet along a section of the boom 120, connecting several units 121 and spanning several spaces 122. In some embodiments the boom 120 includes a large number of units 121 and spaces 122.

In some embodiments one or both ends of the boom 120 include a connecting plate 123. In some embodiments the connecting plate 123 may be used to connect an end of the boom 120 to an end of another boom 120, thereby constructing a longer boom 120.

In some embodiments the boom 120 optionally includes a continuous strap 124 along the section of the boom 120, connecting one end of the section of the boom 120, optionally one connecting plate 123, to another end of the section of the boom 120, optionally another connecting plate 123. In some embodiments the strap 124 extends beyond an end of the end plate 123. In some embodiments the strap 124 is longer than the boom 120.

In some embodiments the connecting plate 123 optionally includes a hook or a loop or a ring which may be used to grasp or to hook or gaff an end of the boom 120.

In some embodiments the connecting plate 123 optionally includes a ring 125 or a hook 126 for attaching an end of the boom 120 to another end of the same or another boom 120, thereby completing an encirclement of a material spill.

Reference is now made to FIG. 2A, which is a simplified illustration of a unit of a boom according to an example embodiment of the invention.

FIG. 2A shows a unit 200 of a boom expanded in a shape as if deployed.

The unit 200 includes:

top plates 201a 201b connected to each other, optionally flexibly connected, optionally by being attached to a flexible sheet such as the flexible sheet 105 of FIG. 1A;

lower plates 202a 202b connected to each other and to the top plates 201a 201b, optionally flexibly connected, optionally by being attached to a flexible sheet such as the flexible sheet 105 of FIG. 1A; and optional additional plates 203a 203b optionally connected to each other and/or to the lower plates 202a 202b, optionally flexibly connected, optionally by being attached to a flexible sheet such as the flexible sheet 105 of FIG. 1A.

the shape of the unit 200 corresponds to the shape of the units 101a 101c of FIG. 1A.

Reference is now made to FIG. 2B, which is a simplified illustration of a unit of a boom according to an example embodiment of the invention.

FIG. 2B shows a unit 210 of a boom expanded in a shape as if deployed.

The unit 210 includes:

top plates 211a 211b connected to each other, optionally flexibly connected, optionally by being attached to a flexible sheet such as the flexible sheet 105 of FIG. 1A;

lower plates 212a 212b connected to the top plates 211a 211b, optionally flexibly connected, optionally by being attached to a flexible sheet such as the flexible sheet 105 of FIG. 1A;

a bottom plate 214 connected to the lower plates 212a 212b, optionally flexibly connected, optionally by being attached to a flexible sheet such as the flexible sheet 105 of FIG. 1A; and optional additional sheets 213a 213b connected to the bottom plate 214, optionally flexibly connected, optionally by being attached to a flexible sheet such as the flexible sheet 105 of FIG. 1A.

In some embodiments the bottom plate 214 is a flexible sheet, optionally part of a lengthy sheet such as the sheet 105 of FIG. 1A. in some embodiments a flexible sheet for a boom formed by the units of FIG. 2B forms a shape of a hollow tube, optionally with additional flaps attached to the additional plates 213a 213b.

It is noted that example embodiments of a boom using plates such as the plates shown in FIGS. 1A, 2A and 2B can form various shapes when expanded, depending on various numbers of plates per unit, various sizes, optionally forming polygonal shapes.

Figure 3A:
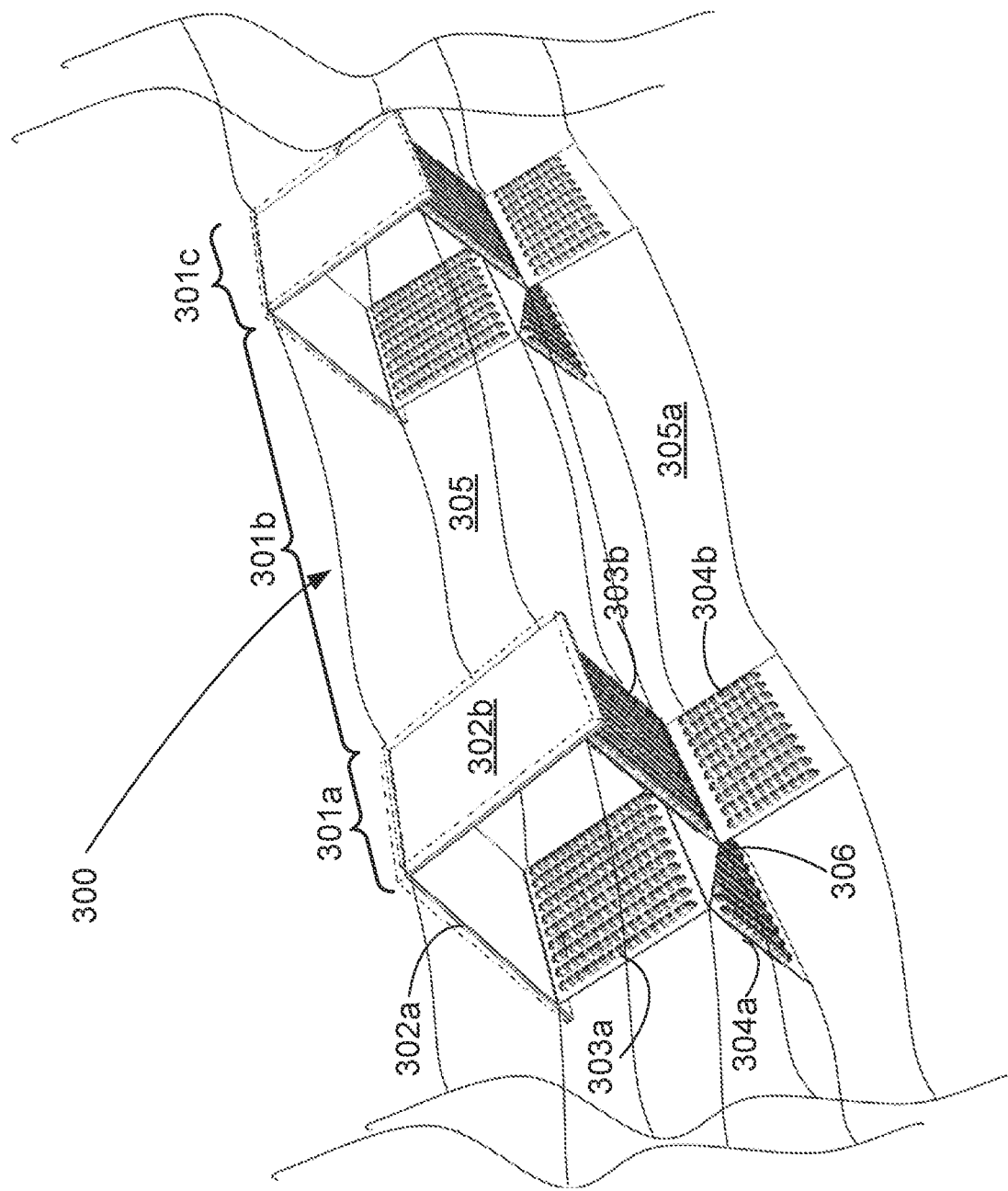
FIG. 3A is a simplified illustration of a portion of a boom according to an example embodiment of the invention.

Reference is now made to FIG. 3A, which is a simplified illustration of a portion of a boom according to an example embodiment of the invention.

FIG. 3A shows a portion of a boom 300 with units 301a 301c in the shape of the example embodiment shown in FIGS. 2A and 2B. FIG. 3A also show the units 301a 301c connected to each other by flexible sections 301b including a flexible sheet 305.

FIG. 3A shows the portion of the boom 300 spread out as if deployed. FIG. 3A is intended to demonstrate an example embodiment of the boom 300 deployed vertically in water (the water is not shown in FIG. 3A).

The boom 300 includes the units 301a 301c connected to each other by a flexible sheet 305. FIG. 3A illustrates the boom 300 as if floating on wavy water with the flexible sheet 305 bending with the waves.

In some embodiments a unit 301a 301c of a shape shown in the example embodiment of FIG. 3A is optionally made of plates 302a 302b 303a 303b and optionally also additional plates 304a 304b.

In some embodiments a bottom plate 306 connects the two lower plates 303a 303b. in some embodiments a flexible sheet 306 connect the two lower plates 303a 303b.

In some embodiments the plates 302a 302b 303a 303b 304a 304b and optionally 306 are flat.

In some embodiments the upper plates 302a 302b are made of a light material optionally the upper plates 302a 302b are lighter than water.

In some embodiments the upper plates 302a 302b are made of a closed cell foam material, to be light, optionally lighter than water.

In some embodiments the upper plates 302a 302b are made of a closed cell foam material attached to rigid plates. In some embodiments the closed cell foam material is attached to an outer side of the rigid plates.

In some embodiments the upper plates 302a 302b include floating sections with air locked inside. The floating sections optionally function both as a structural component and as a floating component of the boom.

In some embodiments lower plates 303a 303b are made of an open cell foam material, to be light, yet when immersed in water, to soak up the water and become heavier, optionally heavier than water.

In some embodiments optional additional plates 304a 304b are attached to edges of the lower plates 303a 303b. In some embodiments the additional plates 304a 304b are made of an open cell foam material, to be light, yet when immersed in water, to soak up the water and become heavier, optionally heavier than water.

In some embodiments the lower plates 303a 303b and the optional additional plates 304a 304b are under a surface of the water when deployed, and the upper plates 302a 302b are partly or entirely above the surface of the water.

In some embodiments the sheet 305 is continuous along the section of the boom 300.

In some embodiments the sheet 305 is shaped as a tube. In some embodiments the sheet 305 is shaped as a tube with one or more additional flap(s) 305a, optionally attached to the one or more additional plates 304a 304b.

In some embodiments the sheet 305 is attached to the units 301a 301c, forming, when expanded, a tube corresponding to the form shaped by the plates 302a 302b 303a 303b.

In some embodiments the sheet 305 305a is also attached to the additional plates 304a 304b, forming a tube with one or more additional flap(s) 305a below the tube.

In some embodiments, the sheet 305 505(a) has at least one strengthening strap (not shown) along its length. In some embodiments the strengthening strap is made of a material which is flexible and tear and/or cut and/or abrasion resistant. In some embodiments the strengthening strap is made of a fabric material such as, by way of some non-limiting examples, Endumax, Kevlar, Nomex, and Cordura.

Figure 3B:
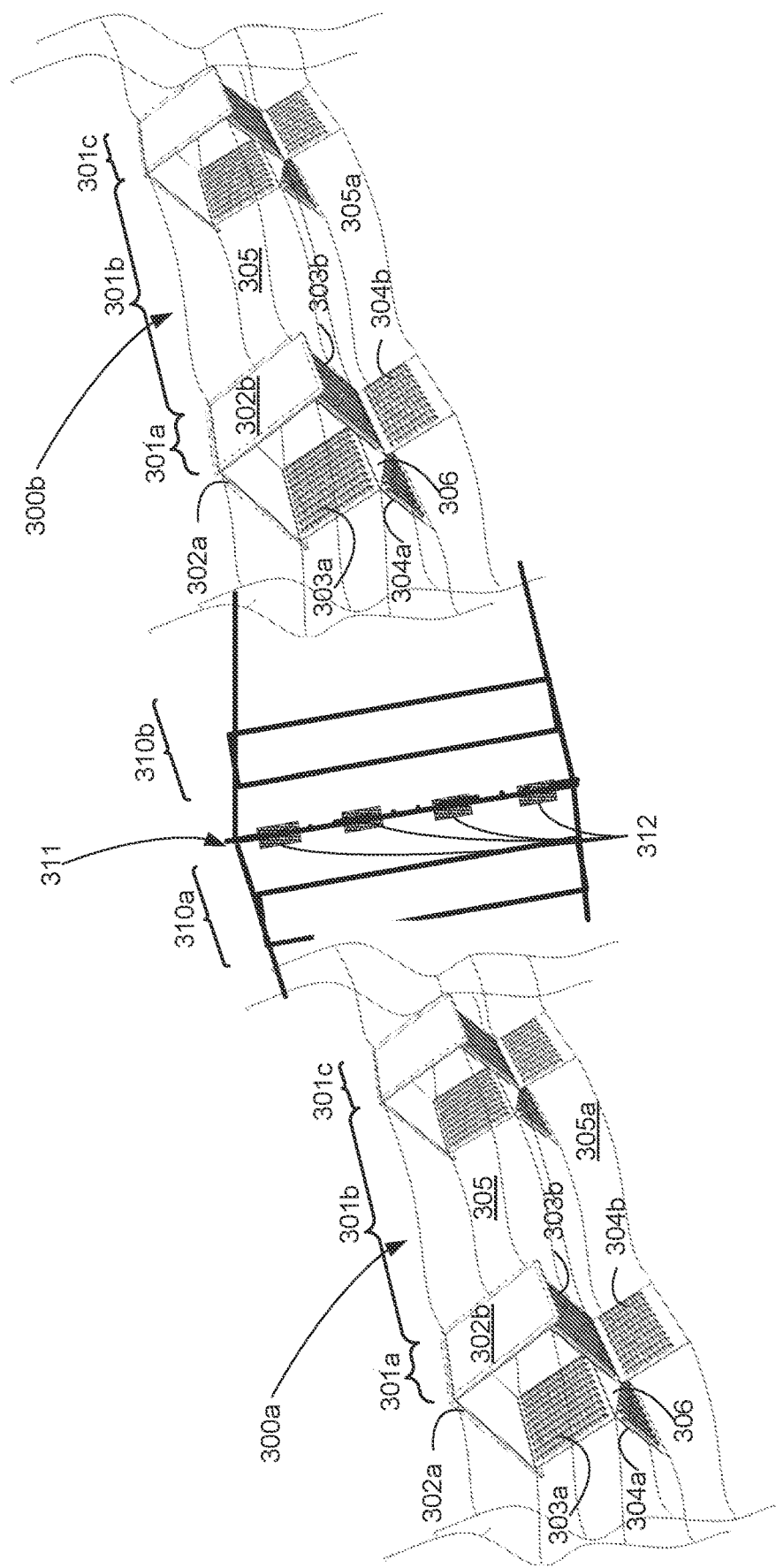
FIG. 3B is a simplified illustration of a first boom section connected to a second boom section according to an example embodiment of the invention.

Reference is now made to FIG. 3B, which is a simplified illustration of a first boom section connected to a second boom section according to an example embodiment of the invention.

FIG. 3B shows a first section of a boom 300a with units 301a 301c in the shape of the example embodiment shown in FIGS. 2A and 2B, connected by a first connecting section 310a which is attached to an end of the first section of the boom 300a, to a second connecting section 310b attached to an end of a second section of the boom 300b.

FIG. 3B is intended to demonstrate an example embodiment of the boom sections 300a 300b deployed vertically in water (the water is not shown in FIG. 3B).

FIG. 3B shows the sections of the boom 300a 300b spread out as if deployed.

The boom sections 300a 300b each includes the components described with reference to FIG. 3A, that is, units 301a 301c connected to each other by a flexible sheet 305. In some embodiments the unit 301a 301c are optionally made of plates 302a 302b 303a 303b and optionally also additional plates 304a 304b. In some embodiments a bottom plate 306 connects the two lower plates 303a 303b. in some embodiments a flexible sheet 306 connect the two lower plates 303a 303b.

In some embodiments the lower plates 303a 303b and the optional additional plates 304a 304b are under a surface of the water when deployed, and the upper plates 302a 302b are partly or entirely above the surface of the water.

In some embodiments each section of a boom 300a 300b ends in a connecting section 310a 310b respectively.

FIG. 3B shows the boom sections 300a 300b standing vertically in the water (the water is not shown in FIG. 3B), and the connection sections 310a 310b also standing vertically in the water.

FIG. 3B shows the connections sections 310a 310b connected to each other by connectors 312 attached to each one of the connections sections 310a 310b, as will be described in more detail further below, with reference to FIGS. 5A and 5B.

FIG. 3B shows that a connection 311 between the connecting sections 310a 310b can optionally be closed, without an opening for spilled oil to pass through the connection 311.

Figure 4A:
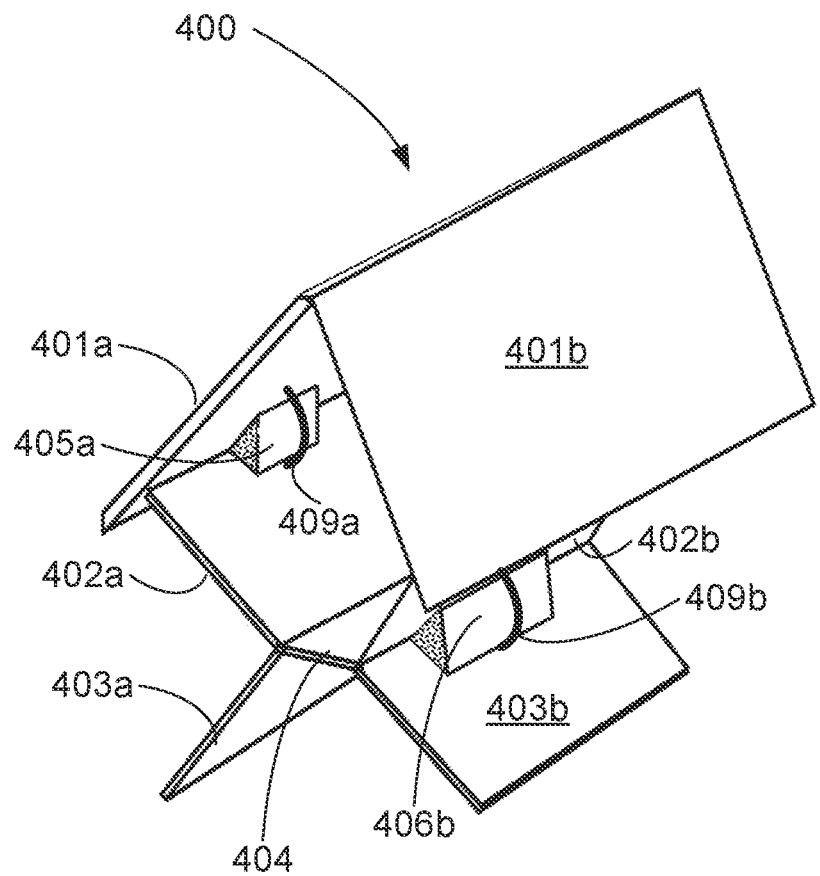
FIG. 4A is a simplified illustration of a unit of a boom according to an example embodiment of the invention.

Reference is now made to FIG. 4A, which is a simplified illustration of a unit of a boom according to an example embodiment of the invention.

FIG. 4A shows a unit 400 of a boom expanded in a shape as if deployed, and an example embodiment of a mechanism for expanding the unit 400 when deployed.

The unit 400 includes:

top plates 401a 401b connected to each other, optionally flexibly connected, optionally by being attached to a flexible sheet such as the flexible sheet 105 of FIG. 1A;

lower plates 402a 402b connected to the top plates 401a 401b, optionally flexibly connected, optionally by being attached to a flexible sheet such as the flexible sheet 105 of FIG. 1A;

a bottom plate or flexible sheet 404 connected to the lower plates 402a 402b, optionally flexibly connected, optionally by being attached to a flexible sheet such as the flexible sheet 105 of FIG. 1A; and optional additional sheets 403a 403b connected to the bottom plate or flexible sheet 404, optionally flexibly connected, optionally by being attached to a flexible sheet such as the flexible sheet 105 of FIG. 1A.

FIG. 4A also shows an example embodiment of a mechanism for expanding the unit 400 when deployed.

FIG. 4A shows a sponge 405a attached to the unit 400 at an inner vertex between the top plate 401a and the lower plate 402a.

In some embodiments, when the unit 400 is packaged, the sponge 405a is compressed between the top plate 401a and the lower plate 402a. When the unit 400 is deployed from a packaged state, the sponge 405a optionally expands, opening an angle between the top plate 401a and the lower plate 402a, optionally forming the expanded shape of the unit 400.

In some embodiments a corresponding sponge 405b (not shown) is also attached to the unit 400 at an inner vertex between the top plate 401b and the lower plate 402b.

FIG. 4A also shows a sponge 406b attached to the unit 400 at an outer vertex between the lower plate 402b and the additional plate 403b.

In some embodiments, when the unit 400 is packaged, the sponge 406b is compressed between the lower plate 402b and the additional plate 403b. When the unit 400 is deployed from a packaged state, the sponge 406b optionally expands, opening an angle between the lower plate 402b and the additional plate 403b, optionally forming the expanded shape of the unit 400.

In some embodiments a corresponding sponge 406a (not shown) is also attached to the unit 400 at an outer vertex between the lower plate 402a and the additional plate 403a.

In some embodiments, the foam plates have one or more space(s) in ridges corresponding to a shape and location of the sponge(s) 405a 406a, so that when the unit 400 is compressed, the sponge(s) 405a 406a are compressed into the space(s), potentially enabling packaging of the unit 400 under less compression force, and/or without adding to a thickness of the unit 400 when packaged.

In some embodiments, the foam plates have one or more hollows or depression(s) corresponding to a shape and location of the sponge(s) 405a 406a, so that when the unit 400 is compressed, the sponge(s) 405a 406a contained within the depression(s), potentially enabling packaging of the unit 400 under less or no compression force, and/or without adding to a thickness of the unit when packaged.

In some embodiments, the sponge(s) 405a 406a are optionally attached to the plates by passing (plastic) ties 409a 409b or cords 409a 409b or strings 409a 409b through holes in the plates to which the sponge(s) 405a 406a are attached. In some embodiments the ties 409a 409b go through the sponge(s) 405a 406a. In some embodiments the ties 409a 409b go around the sponge(s) 405a 406a. In some embodiments the cord or string is a plastic cord or string.

In some embodiments the ties 409a 409b limit an expansion of the sponge(s) so that pressure from the sponge(s) forms a desired angle between the plates, and forms a desired shape of the boom.

In some embodiments the ties 409a 409b are connected to the plates by drilling a hole through the plates.

In some embodiments, the sponge(s) 405a 406a are optionally attached to the plates by glue and/or by double sided tape.

It is noted that FIG. 4A does not show the flexible sheet connecting instances of the unit 400 to each other, as a matter of convenience.

Figure 4D:
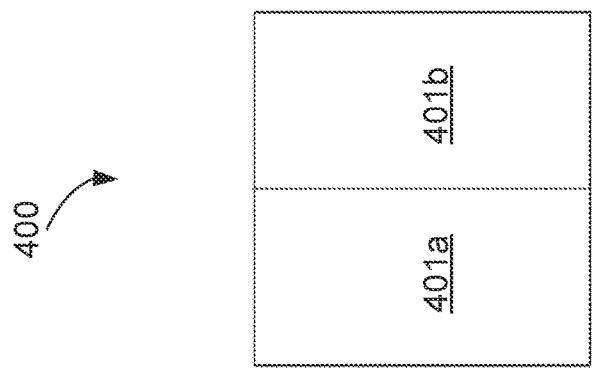
FIGS. 4B, 4C and 4D are simplified illustrations of the unit of FIG. 4A according to an example embodiment of the invention.
Figure 4C:
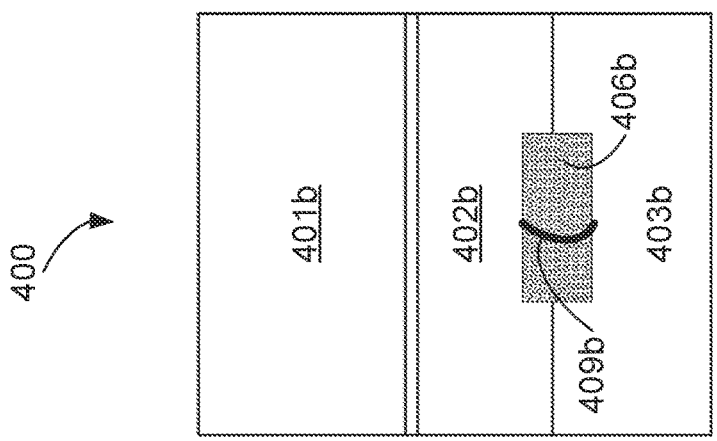
Figure 4B:
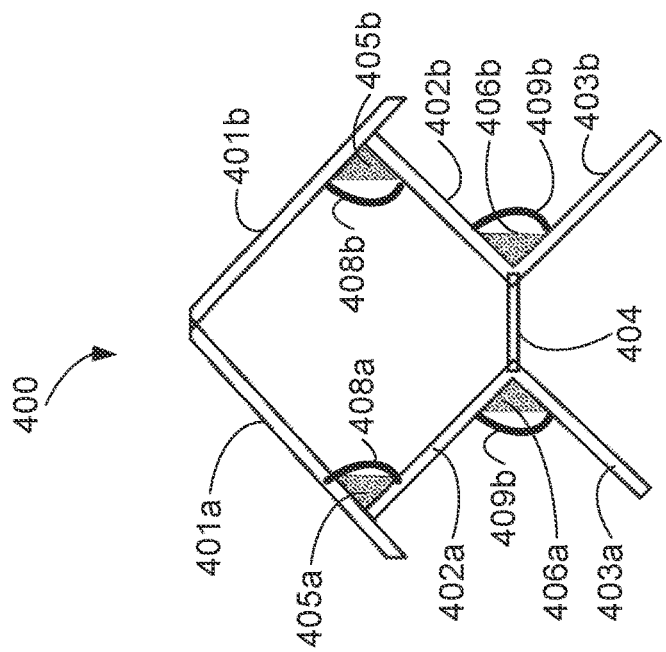

Reference is now made to FIGS. 4B, 4C and 4D, which are simplified illustrations of the unit of FIG. 4A according to an example embodiment of the invention.

FIG. 4B is a cross-sectional view of the unit 400 of FIG. 4A, showing the top plates 401a 401b, the lower plates 402a 402b, and the sponges 405a 405b between the top plates 401a 401b and the lower plates 402a 402b.

FIG. 4B also shows the optional additional plates 403a 403b and the optional sponges 406a 406b between the lower plates 402a 402b and the optional additional plates 403a 403b.

In some embodiments an optional cord or string 408a 408b is attached to the top plates 401a 401b and the lower plates 402a 402b, so as to limit how far an angle between the top plates 401a 401b and the lower plates 402a 402b can open.

In some embodiments an optional cord or string 409a 409b is attached to the lower plates 402a 402b and the additional plates 403a 403b, so as to limit how far an angle between the lower plates 402a 402b and the additional plates 403a 403b can open.

FIG. 4C is a side view of the unit 400 of FIG. 4A, showing the top plate 401b, the lower plate 402b, the optional additional plate 403b, the sponge 406b between the lower plate 402b and the optional additional plate 403b, and the optional cord or string 409b.

FIG. 4D is a top view of the unit 400 of FIG. 4A, showing the top plates 401a 401b.

Figure 4E:
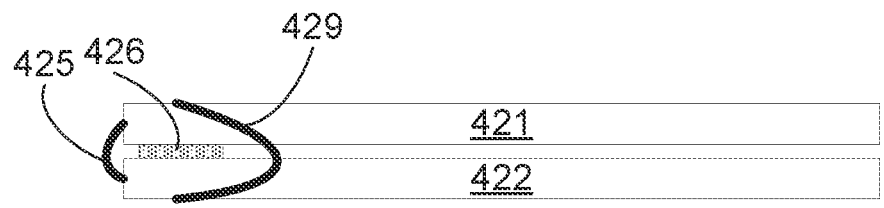
FIGS. 4E and 4F are simplified illustrations of a portion of the unit of FIG. 4A according to an example embodiment of the invention.
Figure 4F:
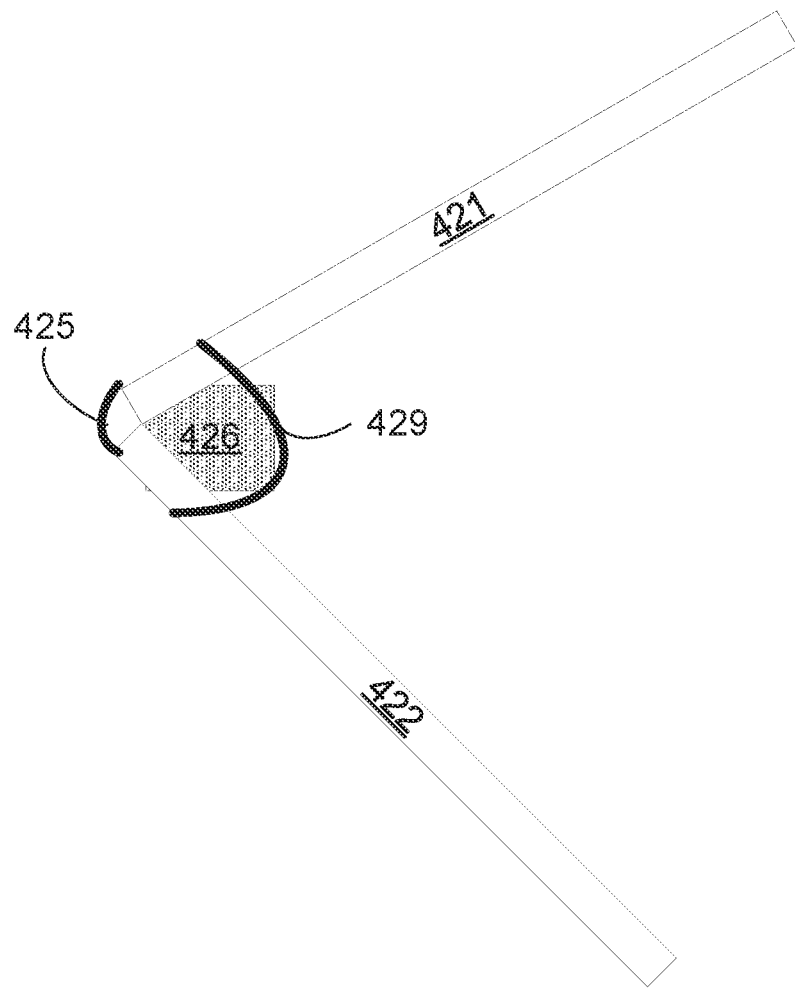

Reference is now made to FIGS. 4E and 4F, which are simplified illustrations of a portion of the unit 400 of FIG. 4A according to an example embodiment of the invention.

FIG. 4E is a cross-sectional view of plates 421 422 similar to the plates described with reference to FIG. 4A, showing the plates 421 422 folded against each other in a manner used for packaging an example embodiment of a boom.

FIG. 4E also shows a sponge 426 between the plates 421 422, and a tie 429 optionally passing through the plates 421 422 and around the sponge 426. As described above, the sponge 426 is optionally compressed, and optionally partially within a hollow in the plates 421 422, to enable the plates to lie flat against each other, optionally even to interleave ridges in one plate into hollows in another plate.

FIG. 4E also shows cross section of a sheet 425 which optionally connects the plates 421 422, and optionally extends along a boom section.

FIG. 4F is a cross-sectional view of the plates 421 422, the sponge 426, the tie 429 and the sheet 425 when the boom is deployed, the sponge 426 expands, and the plates 421 422 are forced away from each other by the sponge 426. In some embodiments a length of the tie 429 limits an angle which the sponge can open between the plates 421 422.

Figure 4G:
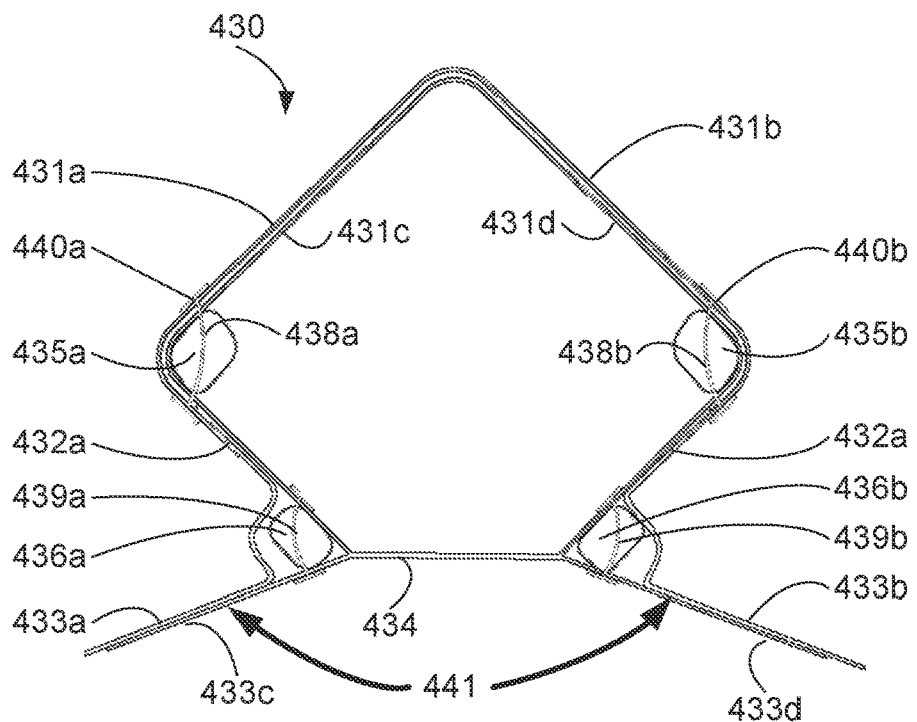
FIG. 4G is a simplified illustration of a unit of a boom according to an example embodiment of the invention.

Reference is now made to FIG. 4G, which is a simplified illustration of a unit of a boom according to an example embodiment of the invention.

FIG. 4G is a cross-sectional view of a unit 430 of a boom, showing top plates 431a 431b, lower plates 432a 432b, and sponges 435a 435b between the top plates 431a 431b and the lower plates 432a 432b. In some embodiments the top plates 431a 431b and/or the lower plates 432a 432b include a second layer 431c 431d. In some embodiments the second layer 431c 43d may be a continuous layer, as shown in FIG. 4G.

FIG. 4G also shows optional additional plates 433a 433b and optional sponges 436a 436b between the lower plates 432a 432b and the optional additional plates 433a 433b. In some embodiments the optional additional plates 433a 433b include a second layer 433c 433d. In some embodiments the second layer 431c 43d may be a continuous layer, as shown in FIG. 4G. FIG. 4G also shows the lower plates 432a 432b connected to each other by a bottom plate 434 or flexible sheet 434.

In some embodiments an optional cord or string 438a 438b is attached to the top plates 431a 431b and the lower plates 432a 432b, so as to limit how far an angle between the top plates 431a 431b and the lower plates 432a 432b can open.

In some embodiments an optional cord or string 439a 439b is attached to the lower plates 432a 432b and the additional plates 433a 433b, so as to limit how far an angle between the lower plates 432a 432b and the additional plates 433a 433b can open.

In some embodiments an angle 441 between the additional plates 433a 433b is optionally an obtuse angle, that is, greater than 90 degrees. In some embodiments that angle 441 is optionally larger than 120 degrees, larger than 140 degrees, larger than 160 degrees and even larger than 170 degrees, up to 180 degrees.

Figure 4H:
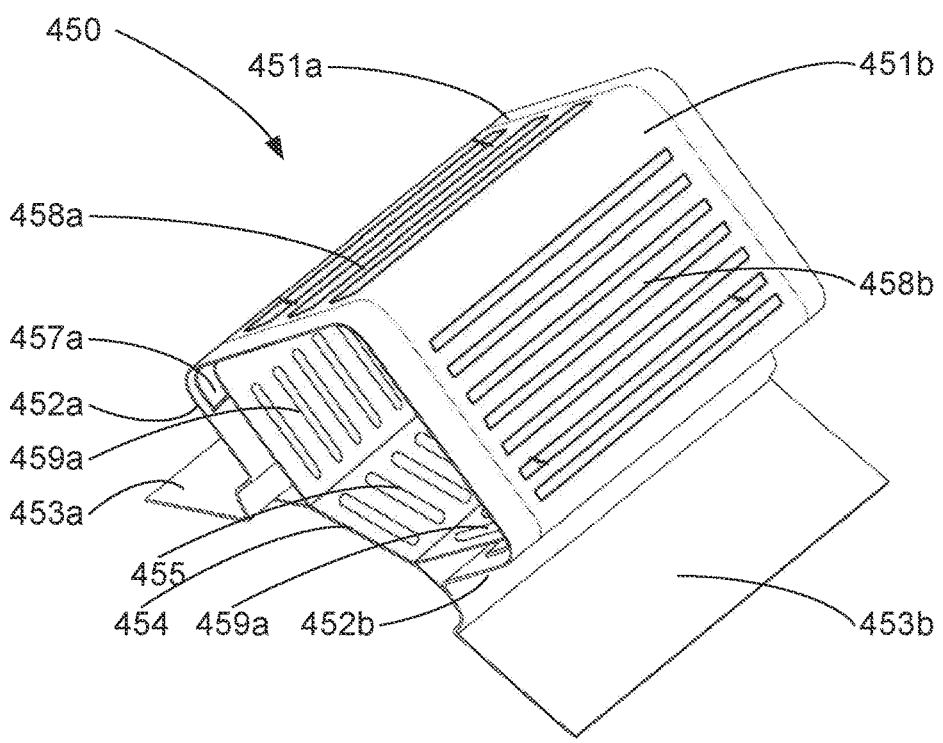
FIG. 4H is a simplified illustration of a unit of a boom according to an example embodiment of the invention.

Reference is now made to FIG. 4H, which is a simplified illustration of a unit of a boom according to an example embodiment of the invention.

FIG. 4H is an isometric view of a unit 450 of a boom.

FIG. 4H shows top plates 451a 451b, lower plates 452a 452b, and additional plates 453a 453b.

FIG. 4H also shows the top plates 451a 451b and the lower plates 452a 452b including an optional additional layer 457a. In some embodiments the additional layer 457 extends along all of the area of the top plates 451a 451b and the lower plates 452a 452b. In some embodiments, as shown in FIG. 4H, the additional layer 457a extends along only part of the top plates 451a 451b and the lower plates 452a 452b.

In some embodiments the top plates 451a 451b include slots 458a 458b. In some embodiments the slots 458a 458b are sealed, potentially lightening weight of the top plates 451a 451b. In some embodiments the reference numbers 458a 458b pertain to sealed air-filled ridges rather than slots, potentially adding to floatation of the top plates 451a 451b.

In some embodiments the lower plates 452a 452b optionally include an additional layer 459a 459b with optional slots. In some embodiments the slots of the additional layer 459a 459b are sealed, potentially lightening weight of the lower plates 452a 452b. In some embodiments the slots of the additional layer 459a 459b are not sealed, potentially lightening weight of the lower plates 452*a* 452*b* while at the same time not adding to floatation power of the lower plates 452*a* 452*b*, which are optionally intended to lie inside the water.

In some embodiments (not shown in FIG. 4H) the slots of the additional layer 459*a* 459*b* are parallel to ridges 458*a* 458*b* of the top plates 451*a* 451*b*.

In some embodiments the slots of the additional layer 459*a* 459*b* are optionally parallel and staggered relative to the ridges 458*a* 458*b* of the top plates 451*a* 451*b*, so that when the boom is packaged, the ridges fit into the slots, and the boom can potentially be packaged taking up less volume, or less thickness.

In some embodiments the lower plates 452*a* 452*b* are optionally connected to each other by a bottom plate 454 or flexible sheet 454, as shown in FIG. 4H.

In some embodiments the bottom plate 454 or flexible sheet 454 includes slots 455, as shown in FIG. 4H.

In some embodiments the slots 455 of the bottom plate 454 are not sealed, potentially lightening weight of the bottom plate 454, while at the same time not adding to floatation power of the bottom plate 454, which is optionally intended to lie inside the water.

Figure 4I:
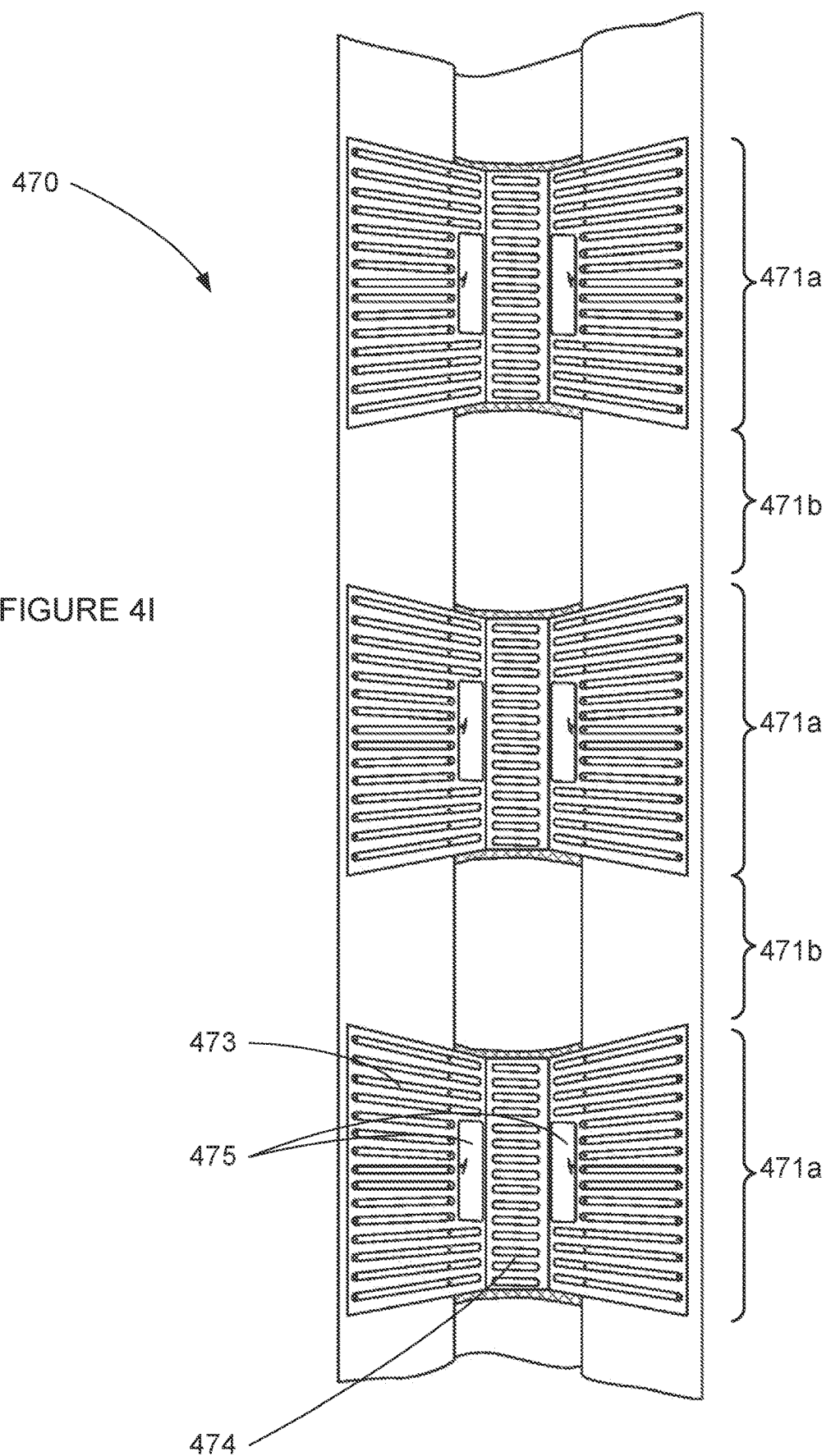
FIG. 4I is a simplified illustration of a portion of a boom section according to an example embodiment of the invention.

Reference is now made to FIG. 4I, which is a simplified illustration of units of a boom section according to an example embodiment of the invention.

FIG. 4I is a bottom view of several units 471*a* of a boom connected to each other by flexible sections 471*b*.

FIG. 4I shows the units including additional plates 473 and bottom plates 474 which include slots and/or ridges.

In some embodiments the slots and ridges are optionally staggered so that the additional plates 473 and/or bottom plates 475 can be packaged taking up less space.

FIG. 4I also shows sponges 472 for opening up and keeping the additional plates 473 at an angle such as the angle 441 of FIG. 4G.

Figure 5A:
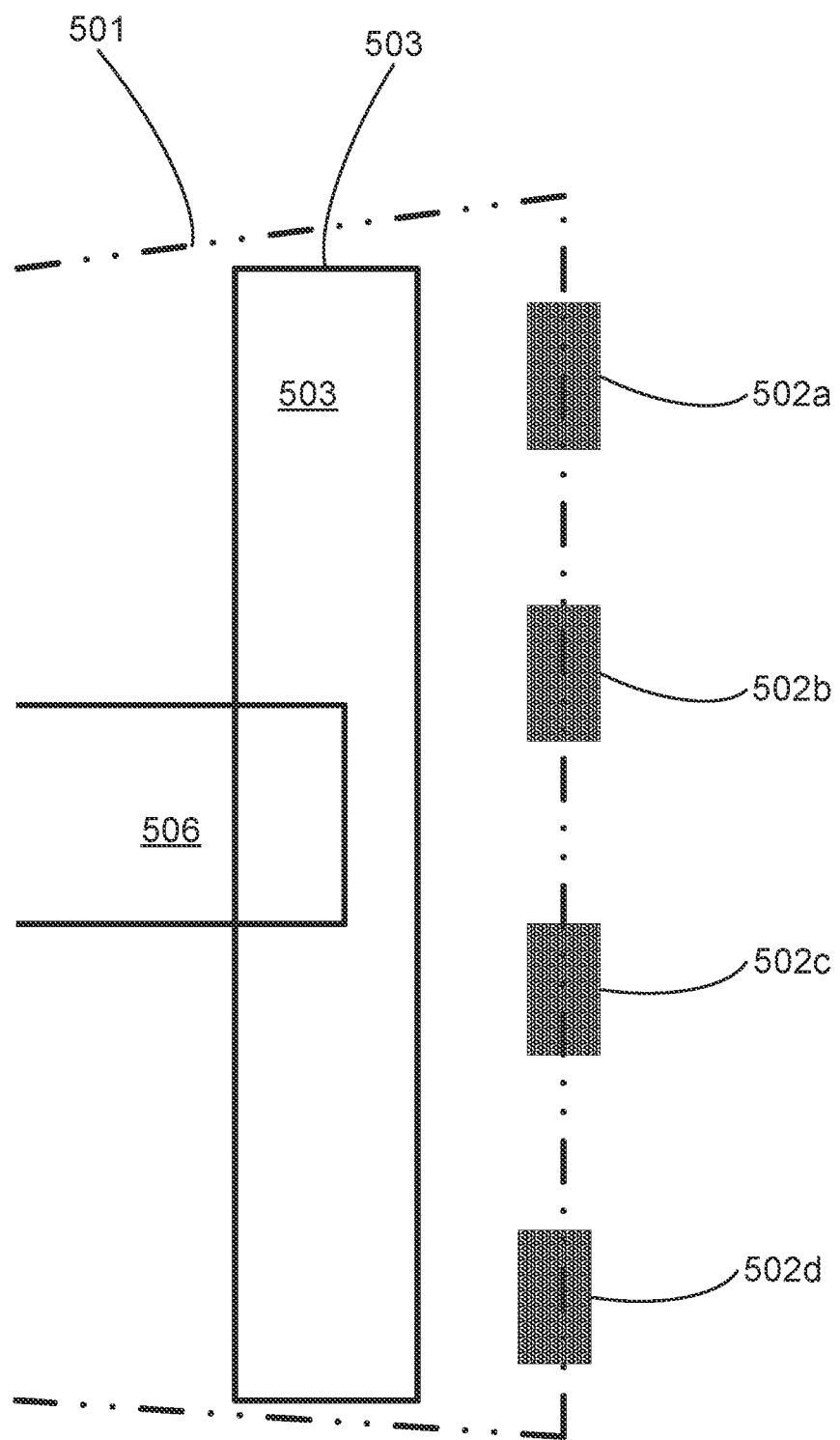
FIG. 5A is a simplified illustration of an end of a boom section and connector(s) to another boom section according to an example embodiment of the invention.

Reference is now made to FIG. 5A, which is a simplified illustration of an end of a boom section and connector(s) to another boom section according to an example embodiment of the invention.

FIG. 5A shows at an end of a boom section a flexible sheet 501, similar to, by way of a non-limiting example, the flexible sheet 105 of FIG. 1A.

FIG. 5A also shows one or more connector(s) 502*a* 502*b* 502*c* 502*d* attached to the flexible sheet 501. The connector(s) 502*a* 502*b* 502*c* 502*d* are designed to mate with corresponding connectors attached to a corresponding flexible sheet at an end of an additional boom section, enabling an option of connecting boom sections together to make a longer boom.

In some embodiments the connector(s) 502*a* 502*b* 502*c* 502*d* optionally connect to corresponding connectors attached to an object, like a pylon of an oil rig, a quay, a pier, and so on, enabling to attach a boom end to such an object.

FIG. 5A shows an optional end plate 503 attached to the flexible sheet 501.

In some embodiments the optional end plate 503 is made of a material which is rigid. A rigid end plate 503 potentially enables a user to align multiple connector(s) 502*a* 502*b* 502*c* 502*d* to multiple mating connectors, and connect the connector(s) 502*a* 502*b* 502*c* 502*d* faster and/or under a movement which can be expected in a floating vessel at sea.

In some embodiments the optional end plate 503 is made of two plates sandwiching the flexible sheet 501.

In some embodiments the connector(s) 502*a* 502*b* 502*c* 502*d* are attached to the flexible sheet 501, as is shown in FIG. 5A. In some embodiments the connector(s) 502*a* 502*b* 502*c* 502*d* are attached to the end plate 503 (not as shown in FIG. 5A).

In some embodiments the optional strap 503 is implemented as an optional strap 503, optionally having a length approximately similar to a height of a deployed boom, and a width in a range of 5 to 50 centimeters.

In some embodiments the optional strap 503 is made of a material which is flexible and tear and/or cut and/or abrasion resistant. In some embodiments the optional strap 503 is made of a fabric material such as, by way of some non-limiting examples, Endumax Kevlar, Nomex, and Cordura.

In some embodiments a strengthening strap 506 such as the strengthening strap 106 described (but not shown) with reference to FIG. 1A is attached along the flexible sheet 501 all the way from one end of a boom section to another.

In some embodiments the strengthening strap 506 is optionally attached to the optional strap 503, whether in a flexible embodiment of the optional strap 503 or in an embodiment of the optional end plate 503.

In some embodiments the strengthening strap 506 optionally includes a handle 507 (not shown).

Figure 5B:
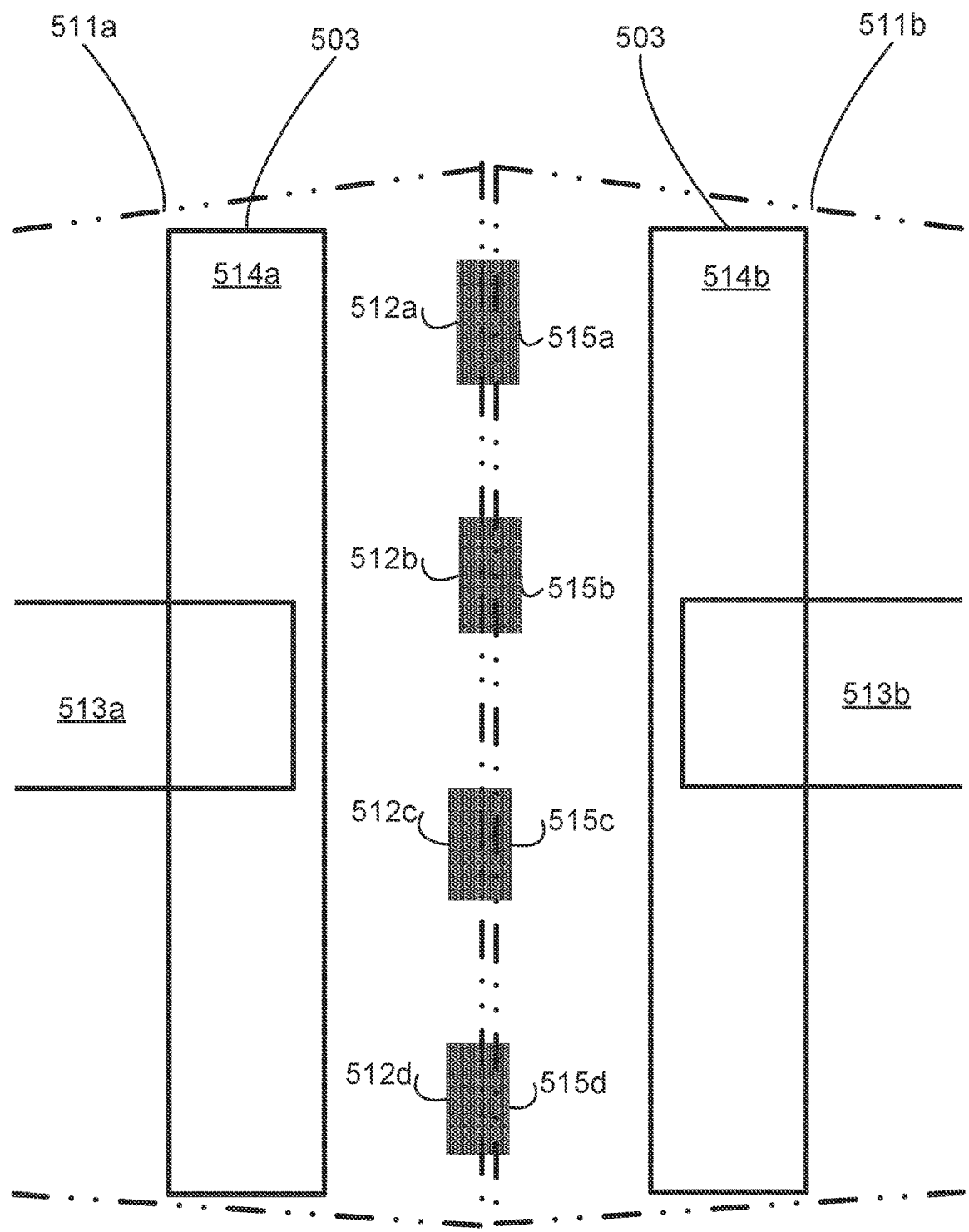
FIG. 5B is a simplified illustration of two ends of two boom sections connected to each other according to an example embodiment of the invention.

Reference is now made to FIG. 5B, which is a simplified illustration of two ends of two boom sections connected to each other according to an example embodiment of the invention.

FIG. 5B shows at an end of a first boom section a flexible sheet 511*a*, similar to, by way of a non-limiting example, the flexible sheet 105 of FIG. 1A, and at an end of a second boom section a flexible sheet 511*b*, also similar to, by way of a non-limiting example, the flexible sheet 105 of FIG. 1A.

FIG. 5B also shows one or more connector(s) 512*a* 512*b* 512*c* 512*d* attached to the flexible sheet 511*a*, and one or more connector(s) 515*a* 515*b* 515*c* 515*d* attached to the flexible sheet 511*b*. The connector(s) 512*a* 512*b* 512*c* 512*d* are designed to mate with corresponding connector(s) 515*a* 515*b* 515*c* 515*d* attached to the flexible sheet 511*b*, enabling an option of connecting boom sections together to make a longer boom.

FIG. 5B shows an optional end plate 514*a* attached to the flexible sheet 511*a*, and an optional end plate 514*b* attached to the flexible sheet 511*b*.

FIG. 5B shows an optional strap 513*a* attached to the flexible sheet 511*a*, and an optional strap 513*b* attached to the flexible sheet 511*b*.

Reference is now made to FIGS. 5C, 5D, 5E and 5F, which are simplified line drawing illustrations of compactly packaging units of a boom section according to an example embodiment of the invention.

Figure 5D:
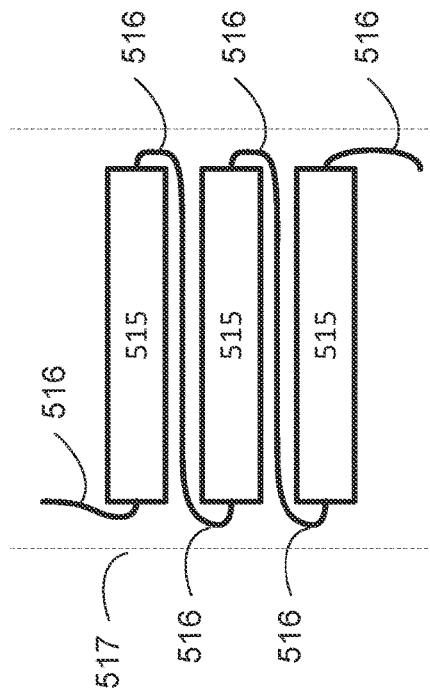
FIGS. 5C, 5D, 5E and 5F are simplified line drawing illustrations of compactly packaging units of a boom section according to an example embodiment of the invention.
Figure 5F:
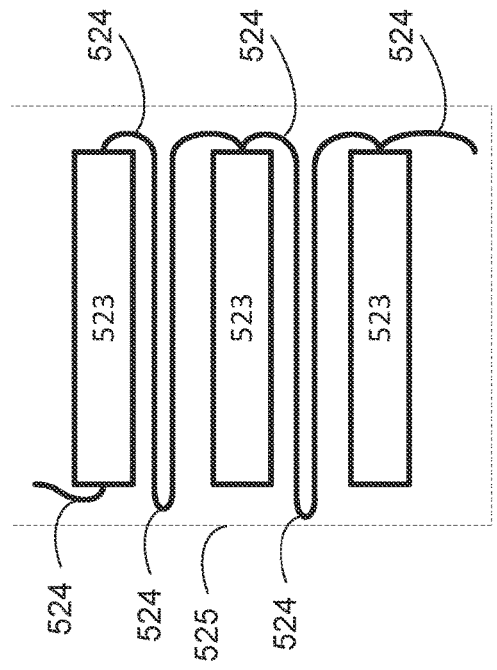
Figure 5C:
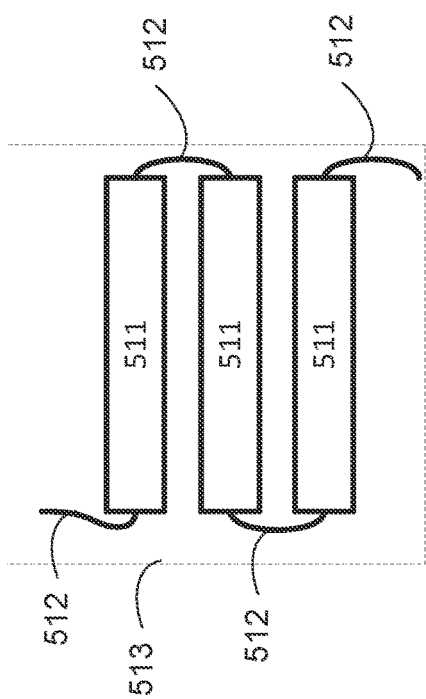

FIG. 5C shows a first example embodiment of an arrangement of packaging units 511 and flexible sheets 512 which connect the units 511. In the example embodiment of FIG. 5C, a length of the flexible sheet 512 between units 511 is short relative to a length of the unit 511, and the boom section is packaged so that the connecting flexible sheets 512 appear at alternating sides of a package or cartridge 513 packaging the boom section.

FIG. 5D shows a second example embodiment of an arrangement of packaging units 515 and flexible sheets 516 which connect the units 515. In the example embodiment of FIG. 5D, a length of the flexible sheet 516 between units 515 is at least as long as a length of the unit 515, and the boom section is packaged so that the connecting flexible sheets 516 connect to a unit 515 at one side, pass between the units 515, and connect to a next unit 515 at an opposite side of a package or cartridge 517 packaging the boom section.

Figure 5E:
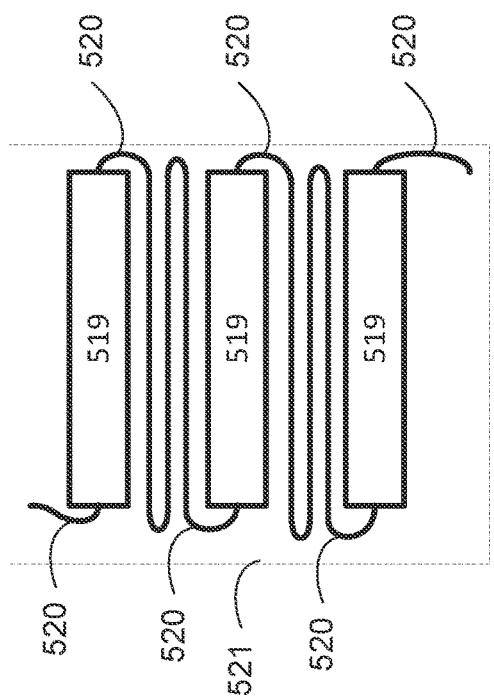

FIG. 5E shows a third example embodiment of an arrangement of packaging units 519 and flexible sheets 520 which connect the units 519. In the example embodiment of FIG. 5E, a length of the flexible sheet 520 between units 519 is longer than a length of the unit 515. The boom section is packaged so that the connecting flexible sheets 520 connect to a unit 519 at one side, pass between the units 519, optionally folded as one or more layers, and connect to a next unit 519 at an opposite side of a package or cartridge 521 packaging the boom section.

FIG. 5F shows a fourth example embodiment of an arrangement of packaging units 523 and flexible sheets 524 which connect the units 523. In the example embodiment of FIG. 5F, the boom section is packaged so that the connecting flexible sheets 524 connect to a unit 523 at one side, are inserted between the units 523, optionally folded as one or more layers, and connect to a next unit 523 at a same side of a package or cartridge 525 packaging the boom section.

Various other ways of packaging flat units and flexible sheets which may be derived from the above examples by a person skilled in the art are also contemplated.

In some embodiments, a cartridge containing a boom section contains a boom section in a length of 20 to 100 to 200 meters.

In some embodiments a boom section is packaged in a carton.

In some embodiments a boom section is packaged in a water soluble cartridge.

In some embodiments a boom section is packaged in a cartridge, and one or more cartridges are optionally packaged into a pod.

In some embodiments a cartridge is waterproof, keeping the foam and/or sponges from taking up moisture, gaining weight and/or expanding when within the cartridge.

In some embodiments a connector plate loop or ring or hook which is attached to one end of a boom section is also attached to the cartridge and/or to the pod, optionally assisting deployment of the boom by preventing an end of a boom section slipping out of the cartridge or the pod.

In some embodiments a user is provided with an opportunity to manually detach the loop/ring/hook from the cartridge/pod and attach the end of the boom section to an end of a next boom section, by virtue of the end of the boom section being prevented from slipping out of the cartridge or the pod.

Figure 5G:
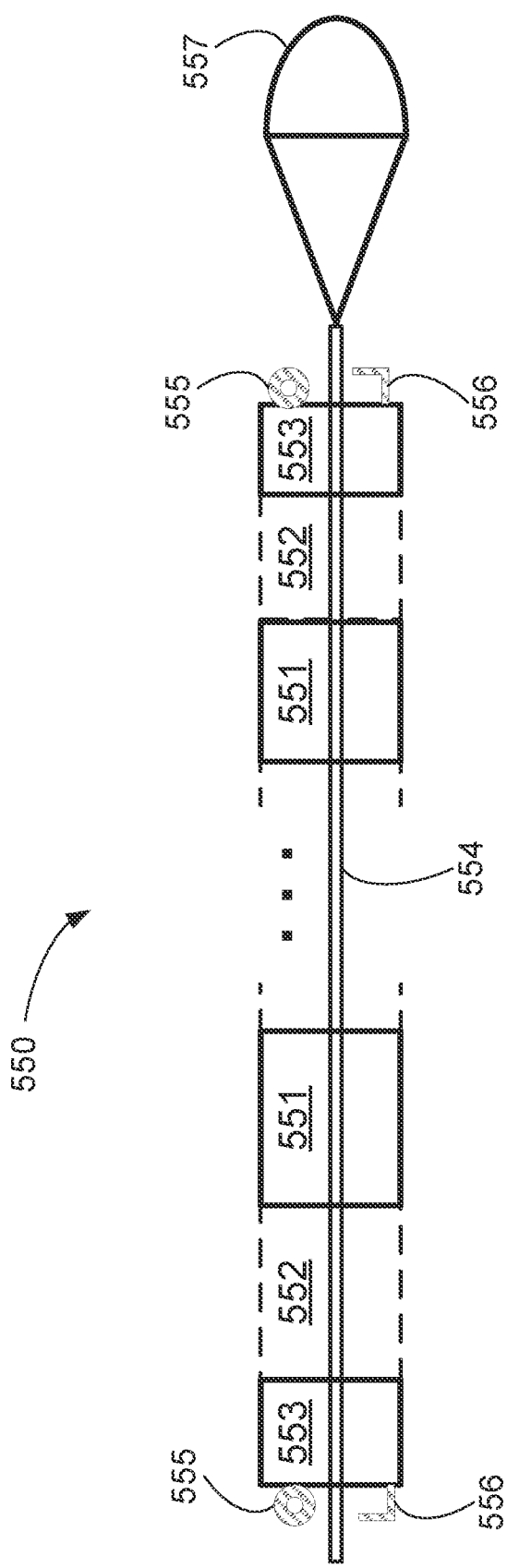
FIG. 5G is a simplified line drawing illustration of a sea anchor attached to a boom section according to an example embodiment of the invention.

Reference is now made to FIG. 5G, which is a simplified line drawing illustration of a sea anchor attached to a boom section according to an example embodiment of the invention.

FIG. 5G shows a boom section 550 made of units 551 connected to each other by spaces 552 where a flexible sheet connects the units 551. In some embodiments the flexible sheet is a continuous sheet along the boom section 550, connecting several units 551 and spanning several spaces 552. In some embodiments one or both ends of the boom section 550 include a connecting plate 553.

In some embodiments the connecting plate 553 may be used to connect an end of the boom section 550 to a sea anchor 557.

In some embodiments one or more sea anchors may optionally serve to float together with and act as a floating anchor(s) to a deployed boom.

In some embodiments the sea anchor 557 optionally serves to anchor and/or drag one end of a boom section 550 while it is being deployed.

In some embodiments the boom section 550 optionally includes a continuous strap 554 along the boom section 550, connecting one end of the boom section 550, optionally one connecting plate 553, to another end of the boom section 550, optionally to another connecting plate 553.

In some embodiments, the sea anchor is optionally connected to the strap 554.

In some embodiments, the sea anchor is optionally connected to the connecting plate 553.

In some embodiments the connecting plate 553 optionally includes a hook 556 and/or a loop or ring 555 which may be used to grasp or to hook or gaff an end of the boom 550.

Figure 5H:
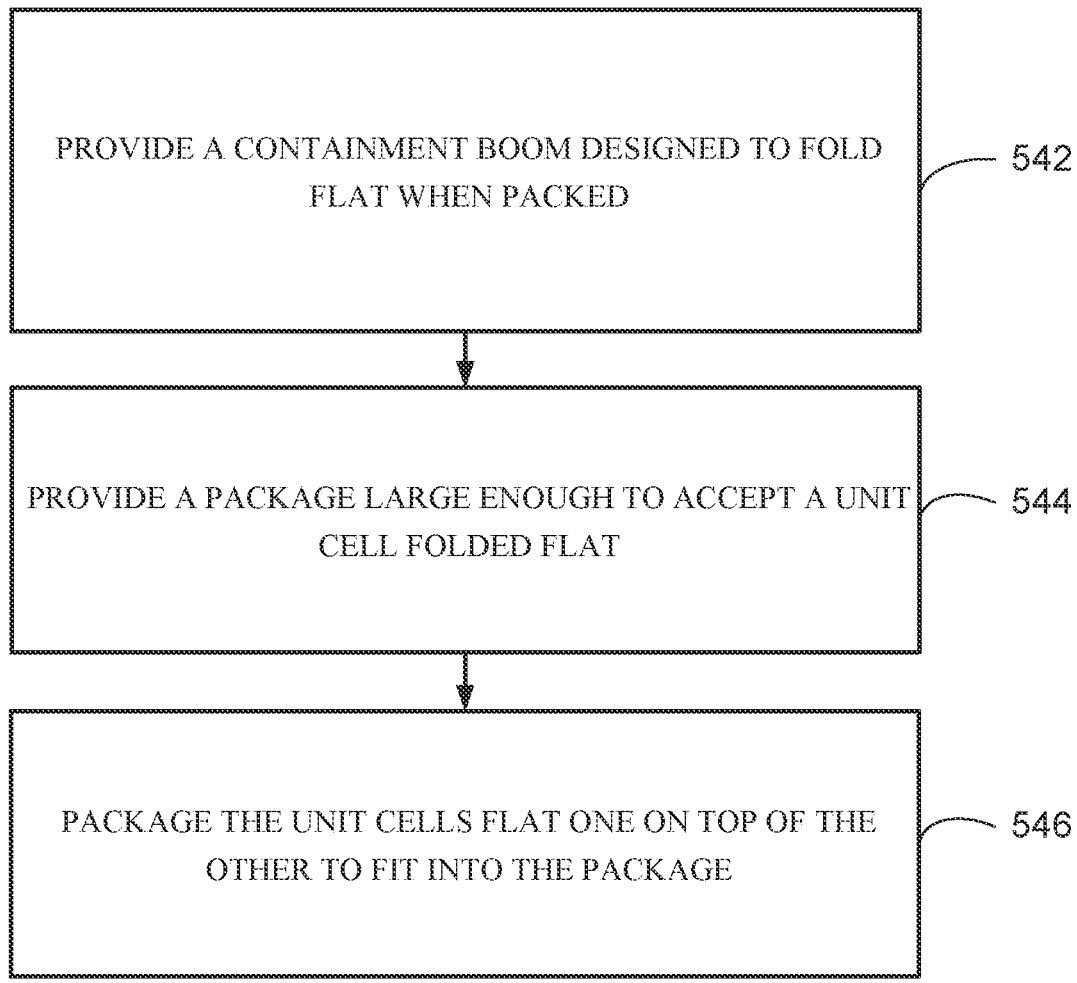
FIG. 5H is a simplified flow chart illustration of a method for packaging a containment boom according to an example embodiment of the invention.

Reference is now made to FIG. 5H, which is a simplified flow chart illustration of a method for packaging a containment boom according to an example embodiment of the invention.

The method of FIG. 5H includes:

providing a containment boom including an elongated sheet including units and spaces between the units, each one of the units including several plates attached to the sheet, designed to fold flat when packed (542);

providing a package having a cross sectional area large enough to accept a unit when the unit is folded flat (544);

packaging the units flat one on top of the other and folding a portion of the elongated sheet which is in the spaces between the units to fit into the package (546).

Reference is now made to FIGS. 6A and 6B, which are simplified illustrations of a small vessel for deploying a boom according to an example embodiment of the invention.

FIGS. 6A and 6B show a small vessel 601 suitable for deploying a boom according to an example embodiment of the invention.

Example embodiments of the boom are designed to be light weight, and suitable for compact packaging, as described above with reference to FIGS. 5C-5F. Example embodiments of the boom are suitable for deployment from small vessels. Such small vessels are more likely to be easily found everywhere, sometimes even as lifeboats on oil rigs and/or larger vessels.

The vessel 601 drawn in FIGS. 6A and 6B is a typical inflatable dinghy.

FIGS. 6A and 6B show the vessel 601 with one or more cartridge(s) 604 which contain an example embodiment of a boom section. In some embodiments, the vessel 601 also contains an optional device 605 for assisting deployment of the boom by sliding the boom into the water between guide rails 606a 606b.

In some embodiments, an end of a boom section is optionally tied to the vessel 601, the cartridge 604, the deployment assisting device 605 or the guide rails 606a 606b, in order to prevent potentially sliding into the water away from person deploying the boom.

In some embodiments one or more of the vessel 601, the cartridge 604, the deployment assisting device 605 and/or the guide rails 606a 606b includes a connector corresponding to, or mating with, one or more connectors of an end of a boom section.

In some embodiments a width 602 of the vessel 601 may be a width of a cartridge plus room for an operator to stand or sit next to the cartridge. In some embodiments a width 602 of the vessel 601 may be 5 meters.

In some embodiments a length 603 of the vessel 601 may be approximately a length of a cartridge. In some embodiments a length 603 of the vessel 601 may be 4 meters. In some embodiments a length 603 of the vessel 601 may be in a range of 4 meters, 6 meters, 8 meters, 10 meters, 15 meters, 20 meters and more. Despite the above description that a small vessel is suitable for deployment of an example embodiment of the boom, it is noted that a large vessel may also be used to deploy an example embodiment of the boom.

Figure 7A:
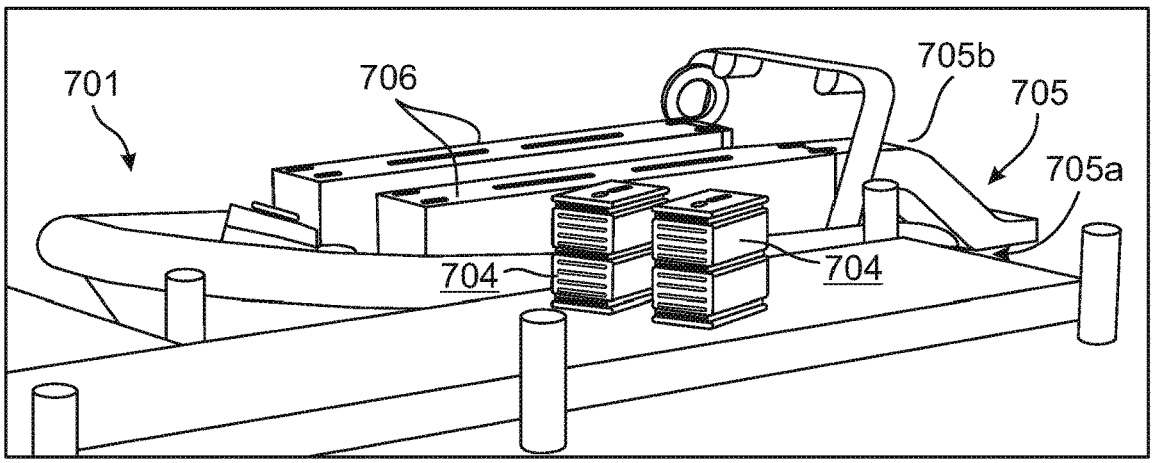
FIGS. 7A and 7B are simplified illustrations of a small vessel for deploying a boom according to an example embodiment of the invention.
Figure 7B:
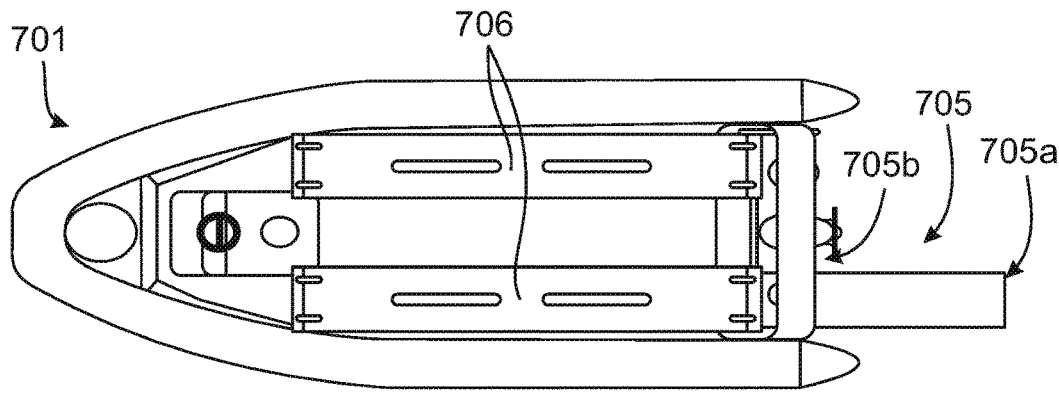

Reference is now made to FIGS. 7A and 7B, which are simplified illustrations of a small vessel for deploying a boom according to an example embodiment of the invention.

FIG. 7A shows an isometric view of a vessel 701, and FIG. 7B shows a top view of the vessel 701.

FIG. 7A shows the vessel 701 next to a pier, on which there are one or more cartridge(s) 704, each one of which contains an example embodiment of a boom section.

FIGS. 7A and 7B show the vessel 701 suitable for deploying a boom according to an example embodiment of the invention. The vessel 701 shown in FIGS. 7A and 7B is, by way of a non-limiting example, a typical inflatable dinghy.

In some embodiments, an optional device 705 for assisting deployment of the boom by sliding the boom into the water is placed on the vessel 701 or attached to the vessel 701 or even built onto the vessel 701.

In some embodiments the device 705 includes a slide or one or more guide rails which guide the boom into the water.

In some embodiments the device 705 is placed in the vessel 701 so that a first end 705a of the device 705 is optionally under water and/or approximately at and/or near the surface of the water, and s second end 705b of the device 705 optionally fits over an edge of the vessel 701 and guides the boom deployment so that units slide over the edge or the gunwale of the vessel 701.

In some embodiment the device 705 is a perforated slide, potentially presenting less water resistance in a portion of the slide which is inside the water.

In some embodiments, the vessel 701 also contains one or more optional housing(s) 706 for housing one or more cartridge(s) 704 on the vessel 701.

In some embodiments, an end of a boom section is optionally tied to one or more of the vessel 701, the device 705, and the housing 706, in order to prevent potentially sliding into the water away from the vessel 701.

FIGS. 7A and 7B show the boom deployment device 705, also termed a boom deployment chute 705 or a slide 705, including a first end 705a for deploying under water, and/or at a surface of the water and/or near the surface of the water, and a second end 705b for guiding the boom deployment over an edge of the vessel 701. In some embodiments the boom deployment assistance device 705 has a shape of a slide leading over the edge of the vessel 701 toward and optionally into the water. In some embodiments the boom deployment assistance device 705 has a shape of a tube leading over the edge of the vessel 701 toward and optionally into the water.

In some embodiments the slide 705 is perforated, potentially exerting less drag on the vessel 701.

In some embodiments the boom deployment assistance device 705 has a shape of a slide leading over the edge of the vessel 701 into the water, and two facing edges of the slide 705 are shaped so as to accept edges of plates of the boom and guide then along the device 705.

Figure 7C:
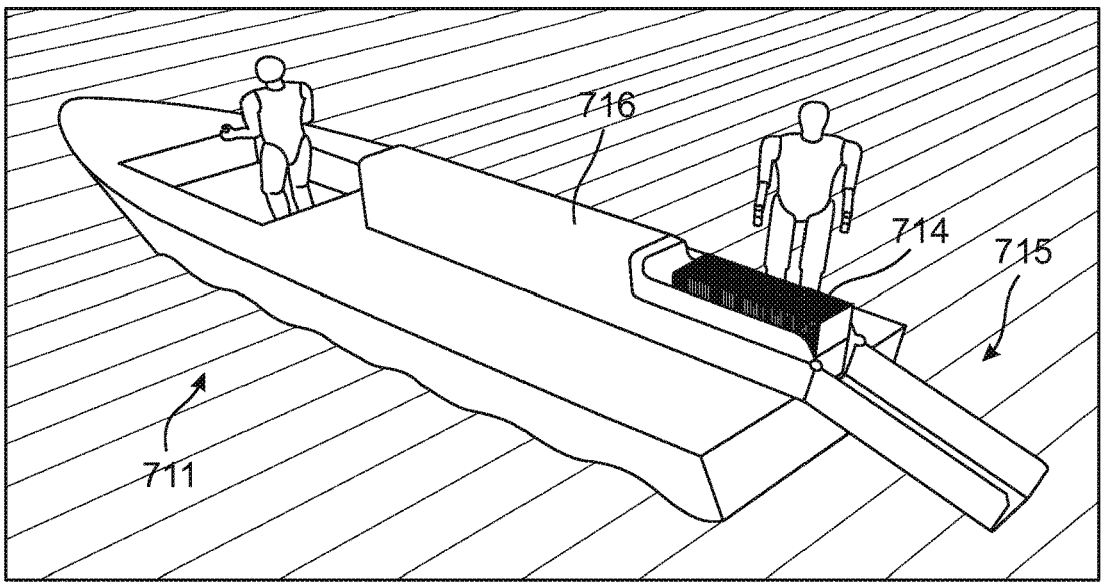
FIG. 7C is a simplified isometric illustration of a small vessel for deploying a boom according to an example embodiment of the invention.

Reference is now made to FIG. 7C, which is a simplified isometric illustration of a small vessel for deploying a boom according to an example embodiment of the invention.

FIG. 7C shows an isometric view of a vessel 711, showing a housing 716 for one or more boom section cartridge(s) 714 on the vessel 711, and a device 715 for deploying the boom.

In some embodiments, an optional device 715 for assisting deployment of the boom by sliding the boom into the water is placed on the vessel 711 or attached to the vessel 711 or even built onto the vessel 711.

In some embodiments the device 715 includes a slide or one or more guide rails which guide the boom into the water.

In some embodiments, the vessel 711 also contains one or more optional housing(s) 716 for housing one or more cartridge(s) 714 on the vessel 711.

Figure 8A:
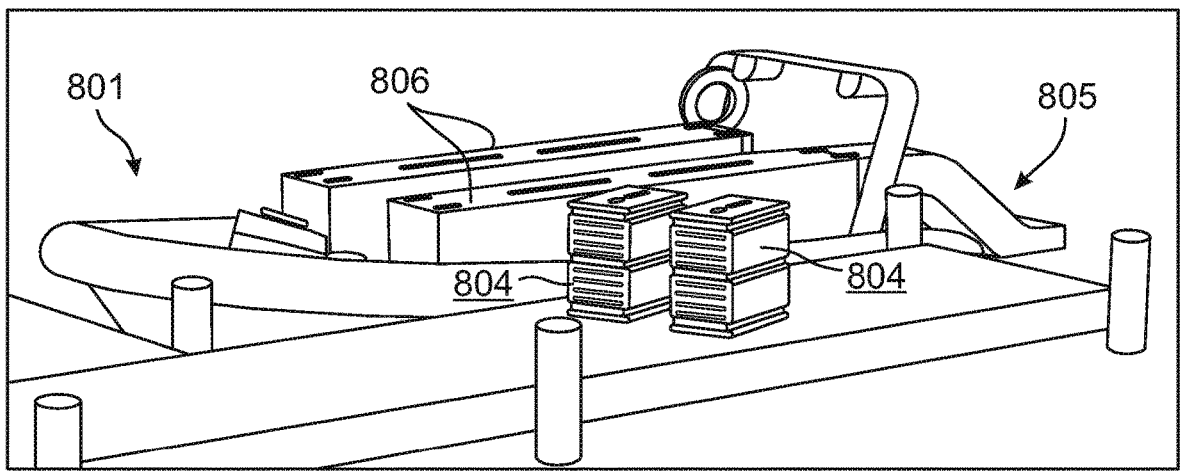
FIG. 8A is a simplified illustration of a small vessel for deploying a boom according to an example embodiment of the invention.

Reference is now made to FIG. 8A, which is a simplified illustration of a small vessel for deploying a boom according to an example embodiment of the invention.

FIG. 8A shows an isometric view of a vessel 801 next to a pier, on which there are one or more cartridge(s) 804, each one of which contains an example embodiment of a boom section.

In some embodiments, the vessel 801 also contains one or more optional housing(s) 806 for housing one or more cartridge(s) 804 on the vessel 801.

In some embodiments, an optional device 805 for assisting deployment of the boom by sliding the boom into the water is placed on the vessel 801 or attached to the vessel 801 or even built onto the vessel 801.

Figure 8B:
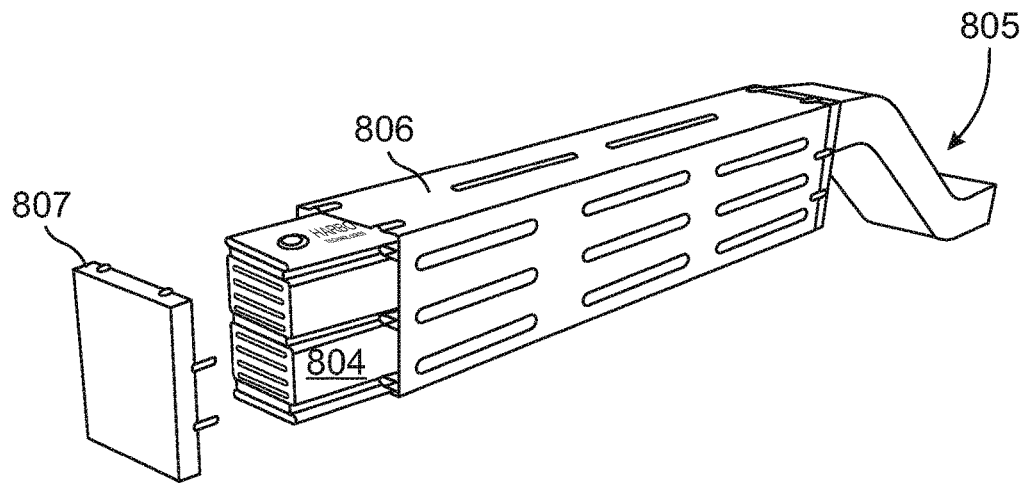
FIG. 8B is a simplified isometric view of a housing for boom section cartridges and a device for deploying boom sections according to an example embodiment of the invention.

Reference is now made to FIG. 8B, which is a simplified isometric view of a housing for boom section cartridges and a device for deploying boom sections according to an example embodiment of the invention.

FIG. 8B shows a housing 806 with an on-board end 807 or door 807 open, to allow loading a boom section cartridge 804 into the housing 806.

FIG. 8B also shows how in some embodiments, a device 805 for deploying boom sections, such as a slide, is optionally aligned with a deployment end of the housing 806, and/or attached to the deployment end of the housing 806.

Figure 8C:
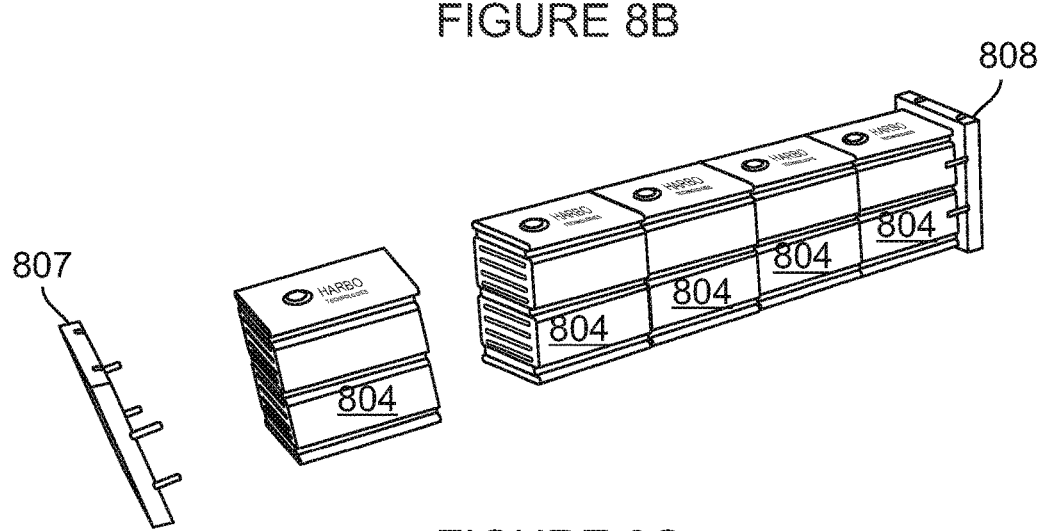
FIG. 8C is a simplified cut-away view of some parts of a housing for boom section cartridges and some boom section cartridges according to an example embodiment of the invention.

Reference is now made to FIG. 8C, which is a simplified cut-away view of some parts of a housing for boom section cartridges and some boom section cartridges according to an example embodiment of the invention.

FIG. 8C shows an on-board end 807 or door 807 of a housing and a deployment end 808 or door of a housing, and several boom section cartridges 804 arranged between the on-board end 807 of the housing and the deployment end 808 of the housing. In some embodiments, more than one cartridge 804 is loaded into a housing.

In some embodiments one or more cartridges 804 are kept protected inside the housing 806. In some embodiments, for deployment, a housing 806 door 808 is optionally opened, to expose a cartridge 804. The cartridge 804 is optionally opened and the boom is optionally pulled away from the cartridge 804 and optionally fed into a deployment chute such as the deployment chute 805.

Figure 8D:
FIG. 8D is a simplified isometric view of a cartridge for packaging a boom section according to an example embodiment of the invention.

Reference is now made to FIG. 8D, which is a simplified isometric view of a cartridge for packaging a boom section according to an example embodiment of the invention.

FIG. 8D shows a cartridge 809 similar to, by way of some non-limiting example, the package described with reference to FIGS. 5C-5F, the cartridges 704 described with reference to FIG. 7A, the cartridge 714 described with reference to FIG. 7C, and the cartridges 804 described with reference to FIG. 8A-8C.

In some embodiments the cartridge 809 is moisture proof, optionally weather proof. In some embodiments, a humidity sensor or a humidity indicator is provided inside a cartridge 809. In some embodiments a humidity indicator is packaged inside a transparent packaging of the cartridge 809, so that it is possible to see an indication of moisture has reached inside the cartridge 809.

Methods of Deployment

In some embodiments the boom is deployed by releasing the boom into the water approximately as fast as the vessel advances, that is, releasing into the water a length of boom approximately as long as a distance the vessel moves forward during the time it takes to pull out and release the boom.

In some embodiments the boom is deployed by a person pulling out a portion of the boom and releasing the portion of the boom into the water approximately as fast as the vessel advances, that is, the person releasing into the water a length of boom approximately as long as a distance the vessel moves forward during the time it takes to pull out and release the boom portion.

In some embodiments an end of the boom is deployed into water, and friction between the water and the boom is enough to pull the boom out of a cartridge as a deployment vessel moves forward. In some embodiments the boom is potentially pulled out of the cartridge at a speed of the deployment vessel.

In some embodiments, the boom is deployed by first attaching one end of a boom section to a sea anchor located at a first location, then navigating a vessel with a boom section cartridge away from the sea anchor while deploying the boom.

In some embodiments the boom is deployed by being dragged out of the boom section cartridge by the sea anchor pulling on the boom.

In some embodiments the boom is deployed by being dragged out of the boom section cartridge by the anchor pulling on the boom, the dragging out optionally performed via a boom deployment assistance device such as the boom deployment assistance devices 605 705 805 in FIGS. 6A, 6B, 7A, 7B, 8A, 8B and 8C.

In some embodiments a boom is made to be longer than a single boom section by connecting an additional boom section to and end of an existing boom section.

In some embodiments a boom is deployed by one vessel using an anchor to hold one end of the boom approximately in place on the water while navigating a course for laying the boom.

In some embodiments a boom is deployed by two vessels, a first vessel acting as an anchor to hold one end of the boom approximately in place on the water while the other vessel navigates a course for laying the boom.

In some embodiments a boom is deployed by two vessels, both vessels laying the boom while navigating a course around a spill.

In some embodiments the above-mentioned anchor is a fixed object, such as a pier. In some embodiments the anchor is a floating sea anchor. In some embodiments the anchor is a boat. In some embodiments the boom is attached to a metal boat or to a metal plate by a magnet at an end of a boom section.

In some embodiments a floating sea anchor is deployed once per boom sections, connected to an end of a boom section. In some embodiments a floating sea anchor is deployed once per several boom sections, connected to an end of a boom section.

In some embodiments the deployment vessel is an unmanned vessel. In some embodiments the deployment vessel is an unmanned vessel, optionally radio controlled from a nearby oil rig or pier or jetty, or from an aircraft above, or remote controlled by satellite communications.

In some embodiments a boom is deployed in an open U shape floating on water, with a spill in the middle of the U. In some embodiments a boom is deployed in an open J shape floating on water, with a spill in the middle of the J. In some embodiments a boom is deployed in a closed shape floating on water surrounding a spill.

In some embodiments the boom floats and moves with the water, fully or partially surrounding the spill and moving with the spill.

Figure 8E:
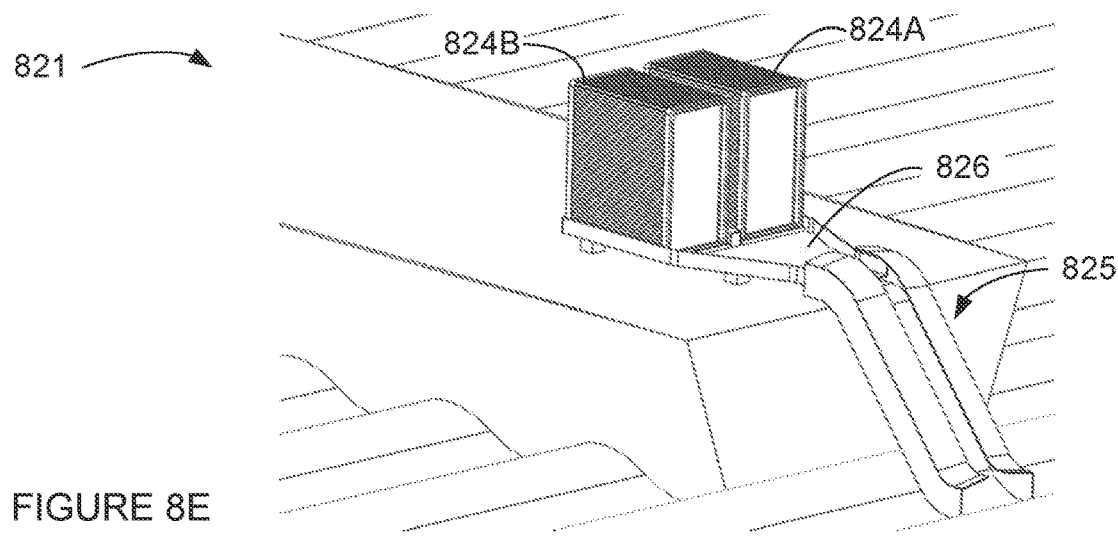
FIGS. 8E, 8F and 8G are a simplified illustration of two boom section cartridges on a deployment vessel according to an example embodiment of the invention.
Figure 8F:
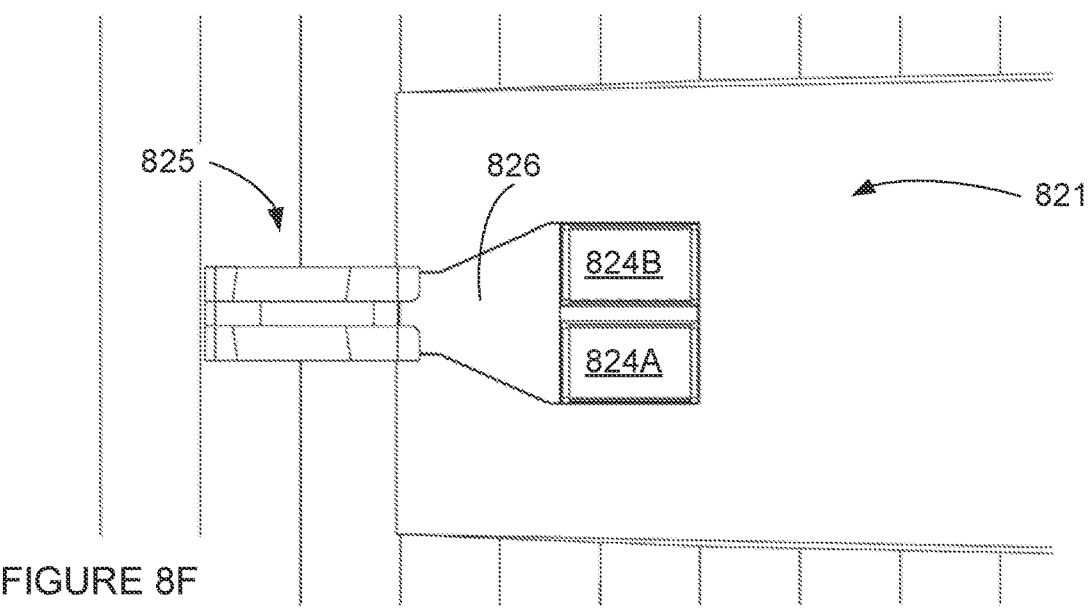
Figure 8G:
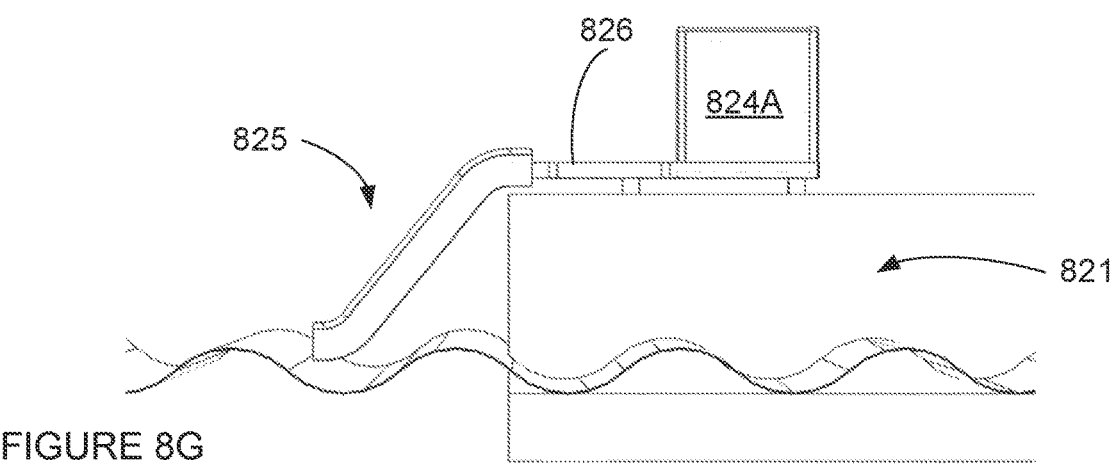

Reference is now made to FIGS. 8E, 8F and 8G, which are a simplified illustration of two boom section cartridges on a deployment vessel according to an example embodiment of the invention.

FIG. 8E is an isometric view, FIG. 8F is a top view, and FIG. 8G is a side view.

FIGS. 8E, 8F and 8G show a deployment vessel 821 on which two boom section cartridges 824A 824B are arranged positioned so that a deployment device 825 such as a slide 825 may optionally include a ramp 826. The ramp 826 can provide boom sections from at least two boom section cartridges 824A 824B to slide into the water via the slide 825.

Figure 9A:
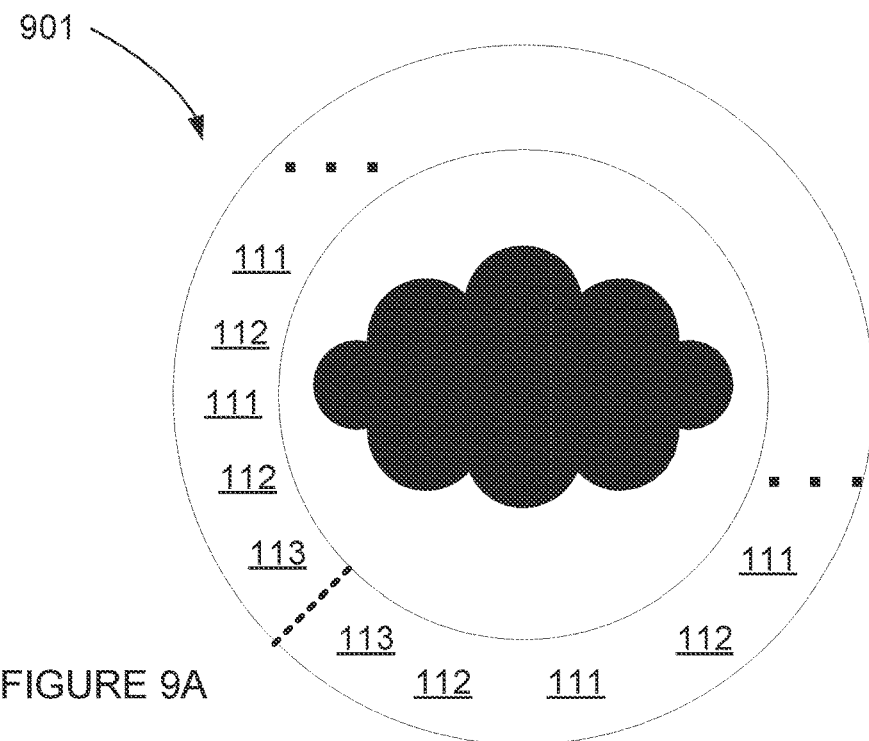
FIGS. 9A, 9B and 9C are simplified block diagram illustrations of boom deployment according to example embodiments of the invention.
Figures 9B, 9C:
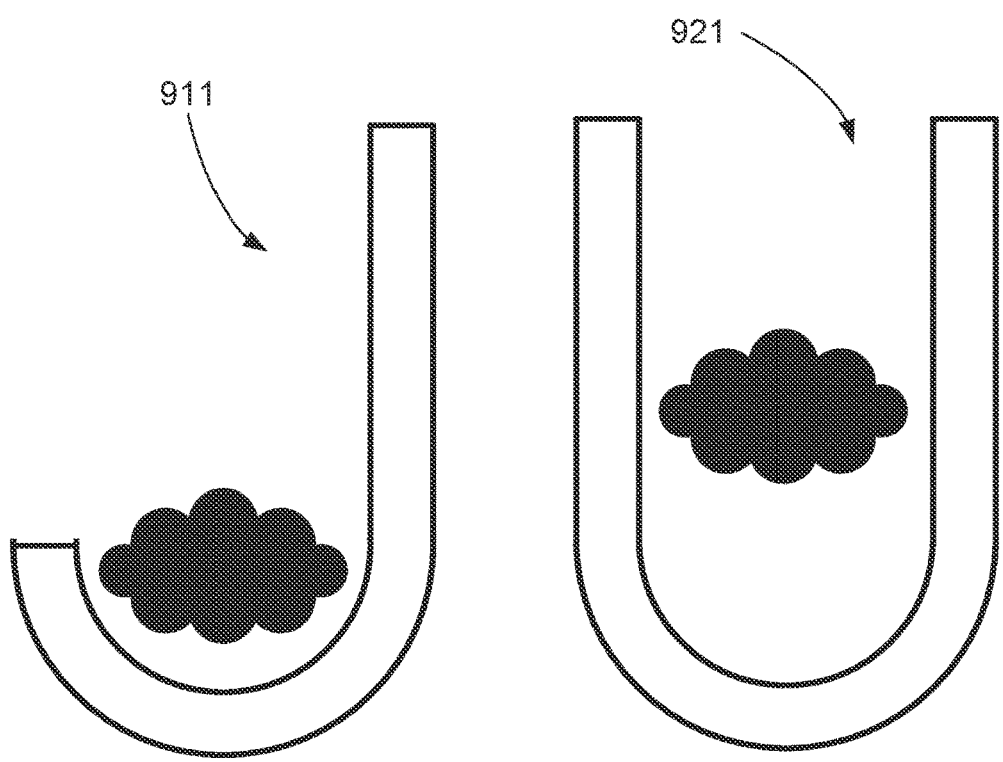

Reference is now made to FIGS. 9A, 9B and 9C, which are simplified block diagram illustrations of boom deployment according to example embodiments of the invention.

FIG. 9A shows a boom 901 deployed, completely surrounding a spill 902. It is noted that the boom 901, even when completely surrounding the spill 902, does not necessarily have to be circular, that is just a shape of the deployed boom 901 in FIG. 9A. It is noted that a width of the boom 901 is not necessarily drawn to scale relative to an area of the spill 902.

In some embodiments the boom 901 is optionally made of one or more boom sections such as shown in FIG. 1B.

In some embodiments the boom sections are optionally made of units 111 connected to each other by spaces 112 where a flexible sheet connects the units 111, and optionally includes one or more optional connector plates 113.

FIG. 9B shows a boom 911 deployed, in a J shape around a spill 902.

In some embodiments the boom 911 is optionally made of one or more boom sections such as shown in FIG. 1B.

In some embodiments the boom sections are optionally made of units 111 connected to each other by spaces 112 where a flexible sheet connects the units 111, and optionally includes one or more optional connector plates 113.

FIG. 9C shows a boom 921 deployed, in a U shape around a spill 902.

In some embodiments the boom 921 is optionally made of one or more boom sections such as shown in FIG. 1B.

In some embodiments the boom sections are optionally made of units 111 connected to each other by spaces 112 where a flexible sheet connects the units 111, and optionally includes one or more optional connector plates 113.

Figure 10A:
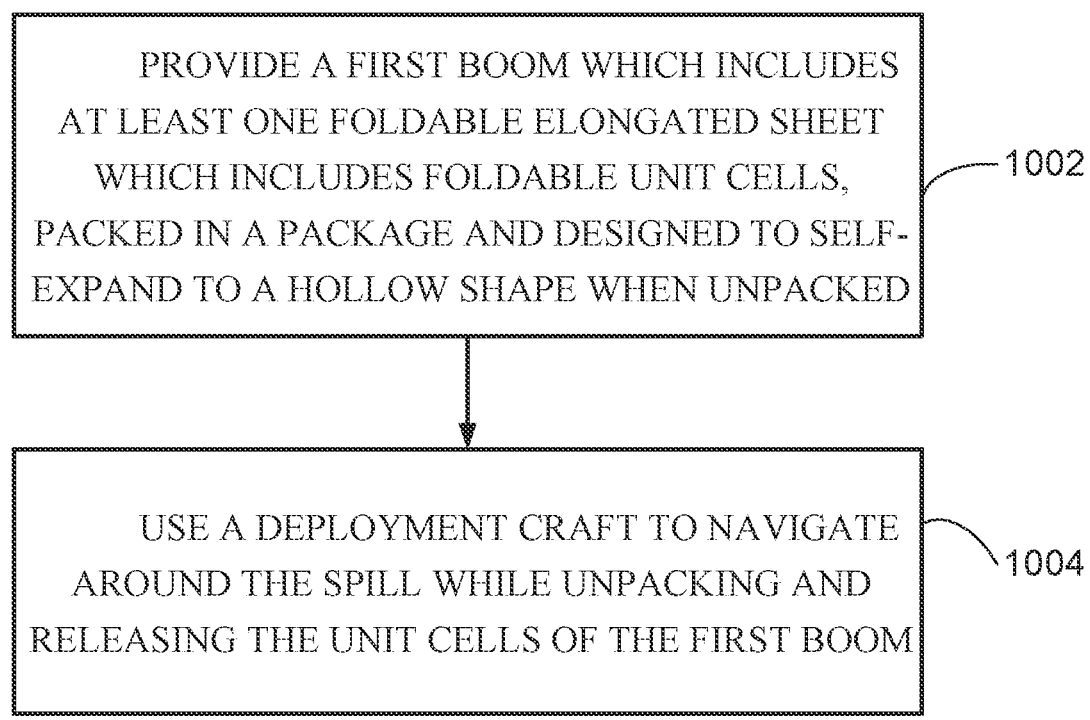
FIG. 10A is a simplified flow chart illustration of a method for preventing or limiting spread of a spill of a floating substance spilled into water according to an example embodiment of the invention.

In some embodiments the boom 901 911 921 is optionally deployed close to the oil spill 902, and the oil spill optionally contacts the boom 901 911 921, potentially using the oil spill 902 to shape the shape of the boom 901 911 921 by pushing on the boom 901 911 921. Reference is now made to FIG. 10A, which is a simplified flow chart illustration of a method for preventing or limiting spread of a spill of a floating substance spilled into water according to an example embodiment of the invention.

The method of FIG. 10A includes:

a) providing a first boom which includes at least one foldable elongated sheet which includes foldable units, packed in a cartridge and designed to self-expand to a hollow shape when unpacked (1002); and b) using a deployment craft to navigate around the spill while unpacking and releasing the units of the first boom (1004), thereby deploying the first boom around at least a portion of the spill, which limits spread of the spill.

In some embodiments, the unpacking and releasing the units of the first boom optionally includes deploying a sea anchor attached to the first boom.

Figure 10B:
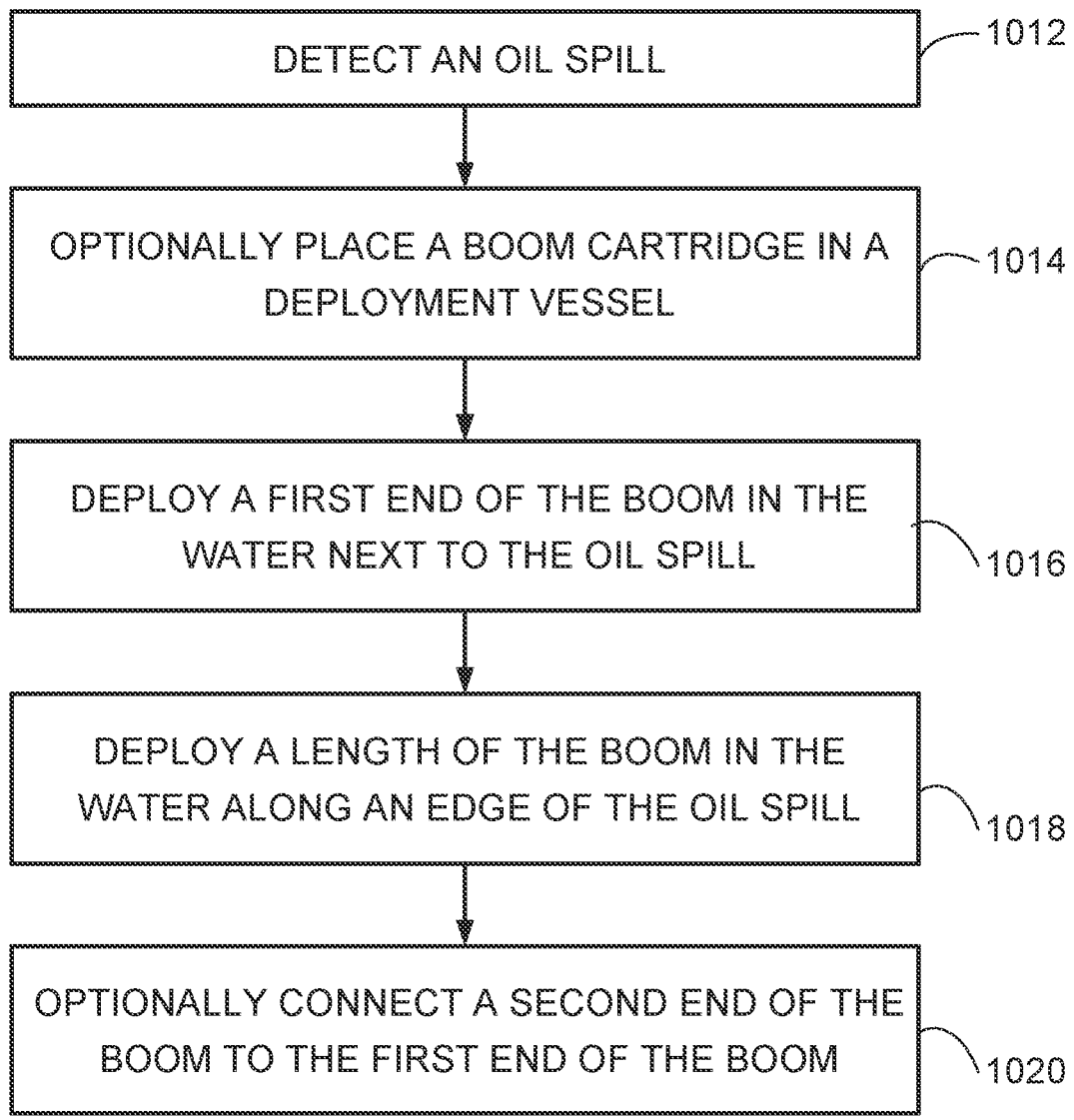
FIG. 10B is a simplified flow chart illustration of a method for preventing or limiting spread of a spill of a floating substance spilled into water according to an example embodiment of the invention.

Reference is now made to FIG. 10B, which is a simplified flow chart illustration of a method for preventing or limiting spread of a spill of a floating substance spilled into water according to an example embodiment of the invention.

The method of FIG. 10B includes:
detecting an oil spill (1012);
optionally placing a boom cartridge in a deployment vessel (1014);
deploying a first end of the boom in the water next to the oil spill (1016);
deploying a length of the boom in the water along an edge of the oil spill (1018);
optionally connecting a second end of the boom to the first end of the boom (1020).

In some embodiments, the boom cartridge is optionally stored in a vessel planned for potential boom deployment, and the action of optionally placing a boom cartridge in the deployment vessel is not necessary.

In some embodiments, more than one boom cartridge is optionally placed in the deployment vessel.

In some embodiments, more than one boom section is deployed, optionally connected end to end.

In some embodiments, the first end of the boom is optionally connected to a fixed object, such as a ship, an oil rig, a pier or an anchor.

In some embodiments, the first end of the boom is optionally connected to a floating object, such as a ship or a sea anchor.

In some embodiments, the boom is optionally placed freely floating with the oil spill.

Various Features of Example Embodiments

As described above, some embodiments of the invention are lightweight. The light weight potentially enables deployment from small craft, such as are easily found around bodies of water. Some non-limiting examples of small craft suitable for carrying and/or deploying a boom according to example embodiments include inflatable dinghies, lifeboats, small motor boats, and so on. On the other hand, such a boom may be deployed from larger vessels with no limitation to size.

In some embodiments a vessel which can carry one cartridge of one boom section, can be any vessel which can carry a cartridge weighing 75 kilograms and one person.

In some embodiments a vessel which can carry one cartridge of one boom section, can be any vessel which can carry a cartridge weighing 75 kilograms and two persons.

In some embodiments one or more person(s) can deploy an example embodiment of the boom from a float of a seaplane.

As described above, some embodiments of the invention require little or no training to deploy, needing at a minimum to be pulled out of a carton and placed in the water, or to be placed into a boom deployment assistance device such as the boom deployment assistance device 805 of FIGS. 8A-8C.

A potential benefit of using an untrained or less trained crew and lighter boom is that the boom can be stowed on-site in more locations, and deployed by people at hand instead of waiting for a trained deployment crew. Quicker deployment can mean less spread of the floating oil, possibly a thicker oil layer, potentially lowering evaporation of fumes.

In some embodiments there is no need for compressors, pumps, compressed air cartridge(s), generators or machinery or tools in order to deploy the boom, such as are widely used while deploying a traditional boom.

As used herein the terms "about" and "approximately" refer to ±25%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A boom for containing floating material spilled in water comprising:
    an elongated sheet comprising units and spaces between the units,
    each one of the units comprising a pair of floatation plates and a pair of ballast plates attached to the sheet, designed to fold flat during storage, and to self-expand into a polygonal cross-sectional shape when deployed, wherein for each said unit a said floatation plate and a said ballast plate define an angle therebetween;
    wherein each said unit has a first and second side and wherein an expander is positioned between said first and second sides of said unit, said expander configured to apply an angle-increasing force to at least one of said floatation plates and said ballast plates of said unit, said angle-increasing force configured to increase the angle defined between a said floatation plate and a said ballast plate on each of said first and second sides of said unit to assist in setting a shape of the boom upon deployment.

2. The boom of claim 1, wherein a plurality of the units comprises at least one plate including closed cell foam material.

3. The boom of claim 1, wherein a plurality of the units comprise at least one plate having one or more sealed air cavities.

4. The boom of claim 1, and further comprising a sponge attached to a unit between a floatation plate and a neighboring ballast plate, designed to expand in water and increase an angle between the floatation plate and the ballast plate.

5. The boom of claim 1, further comprising a strap attached to the floatation plate and to the ballast plate designed to limit said increase of the angle between said floatation and ballast plates upon deployment.

6. The boom of claim 1, wherein said expander is a material configured to expand to apply a force to said floatation and ballast plates to increase said angle to assist in setting a shape of the boom upon deployment.

7. The boom of claim 1, wherein the boom further comprises a strengthening strap along an entire length of the boom, said strengthening strap is attached along said elongated sheet from a first end of the boom to a second end of the boom.

8. The boom of claim 1, wherein the floatation and ballast plates are folded over each other in a zig-zag fashion, and wherein the boom is packaged in a moisture proof cartridge.

9. The boom of claim 1, wherein at least a pair of said units are connected by at least one flexible section extending between said pair of units in a boom section.

10. The boom of claim 1, wherein each said unit has a folded state, wherein in said folded state a said floatation plate lies flat, in a side-to-side orientation next to a said ballast plate, and wherein upon deployment said angle increasing force causes said floatation plate to move away from said ballast plate such that said angle defined between said floatation plate and said ballast plate increases.

11. The boom of claim 1, wherein each said unit has a folded state, wherein in said folded state said unit is folded into at least two layers, a first one of said at least two layers including a floatation plate and a second one of said at least two layers includes a said ballast plate positioned flat, in a side-to-side orientation next to a said floatation plate.

12. The boom of claim 1, wherein each said unit has a folded state, wherein in said folded state said unit is folded into three layers, wherein a first of said three layers includes a floatation plate, a second of said three layers includes a first ballast plate positioned flat, in a side-by-side orientation next to a said floatation plate, and said third of said three layers includes a second ballast plate positioned flat, in a side-by-side orientation next to a said first ballast plate.

13. The boom of claim 1, wherein each said unit has a folded state, wherein in said folded state a said floatation plate is positioned flat, in a side-by-side orientation next to a said ballast plate, and wherein during deployment of a first unit said first unit is oriented vertically, with said floatation plates of said first unit positioned above said ballast plates of said first unit.

14. The boom of claim 13, wherein said boom includes at least first and second units, and wherein during deployment of said second unit said second unit is oriented vertically, with said floatation plates of said second unit positioned above said ballast plates of said second unit.

15. The boom of claim 1, wherein a said unit has at least one predefined fold line, said unit foldable along said at least one predefined fold line.

16. A method for limiting spread of a spill of a floating substance spilled into water, comprising:
    a) providing a first boom section which includes at least one foldable elongated sheet which includes foldable units, packed in a cartridge and designed to self-expand to a hollow shape when unpacked, each one of the units comprising a plurality of pairs of floatation and ballast plates attached to the sheet, designed to fold flat during storage, and to self-expand into a polygonal cross-sectional shape when deployed;
    wherein an expander is positioned between each pair of floatation and ballast plates, said expander configured to apply an angle-increasing force to said floatation and ballast plates of each pair upon deployment to assist in setting a shape of the boom;
    b) using a deployment craft to navigate around the spill while unpacking and releasing the units of the first boom section; and
    c) during said deployment allowing said expander to apply said angle-increasing force to said floatation and ballast plates of each pair to assist in setting the shape of said boom,
    thereby deploying the first boom section around at least a portion of the spill, which limits spread of the spill.

17. The boom of claim 9, wherein a length of said flexible section between said units in said boom section is short relative to a length of each said unit.

18. The boom of claim 17, wherein said boom section has a folded state wherein said flexible sections are at alternating sides of a package of said boom section.

19. The boom of claim 9, wherein said boom section has a folded state wherein each said flexible section passes between consecutive said units, and each said flexible section connects to a next said unit at an opposite side of a package of said boom section.

20. The boom of claim 9, wherein said boom section has a folded state, wherein said flexible sections are connected to a said unit at one side, inserted between said units, and connected to a next said unit at a same side of a package of said boom section.

* * * * *